(12) United States Patent
Kwon et al.

(10) Patent No.: US 8,550,646 B2
(45) Date of Patent: Oct. 8, 2013

(54) BACKLIGHT UNIT

(75) Inventors: Oh Sang Kwon, Incheon-si (KR); Sang Dae Lee, Paju-si (KR); Moon Sik Kang, Guri-si (KR)

(73) Assignee: LG Display Co., Ltd., Seoul (KR)

( * ) Notice: Subject to any disclaimer, the term of this patent is extended or adjusted under 35 U.S.C. 154(b) by 888 days.

(21) Appl. No.: 12/266,785

(22) Filed: Nov. 7, 2008

(65) Prior Publication Data

US 2009/0168401 A1 Jul. 2, 2009

(30) Foreign Application Priority Data

Dec. 31, 2007 (KR) .................. 10-2007-0141547
Jun. 9, 2008 (KR) .................. 10-2008-0053576

(51) Int. Cl.
*G09F 13/04* (2006.01)

(52) U.S. Cl.
USPC .............. 362/97.3; 362/249.02; 362/613

(58) Field of Classification Search
USPC ........... 362/97.3, 227, 230, 231, 249.02, 362/249.06, 612, 613
See application file for complete search history.

(56) References Cited

U.S. PATENT DOCUMENTS

| 7,641,352 B2 * | 1/2010 | Lin et al. ............... 362/97.3 |
| 7,661,835 B2 * | 2/2010 | Chou et al. ............ 362/97.3 |
| 2006/0087827 A1 * | 4/2006 | Jung et al. ............ 362/245 |

FOREIGN PATENT DOCUMENTS

| CN | 1713055 | 12/2005 |
| CN | 101042501 A | 9/2007 |

* cited by examiner

*Primary Examiner* — Y My Quach Lee
(74) *Attorney, Agent, or Firm* — Birch, Stewart, Kolasch & Birch, LLP

(57) ABSTRACT

A backlight unit capable of preventing a degradation in luminance, while achieving a reduction in heat generation and a reduction in manufacturing costs by adjusting the arrangement of the light sources while reducing the number of the light sources is disclosed. The disclosed backlight unit includes a bottom cover formed with a plurality of light source groups each including a plurality of light sources arranged in one direction. The spacing of the adjacent light source groups increases gradually from a central portion of the bottom cover to opposite edges of the bottom cover.

16 Claims, 22 Drawing Sheets

FIG. 17

| Test Item | | Condition | A-type | B-type | C-type | D-type |
|---|---|---|---|---|---|---|
| | | | | Preparation of 47" Samples | | |
| Luminance | | Center Point Luminance | 5540 nit | 5830 nit | 5710 nit | 5949 nit |
| | | Luminance Ratio | 100% | 105.2% | 103.1% | 107.4% |
| Mura | | Luminance Uniformity(12σ), Surface Measurement Result(PM 14G3) | 1.32 | 1.45 | 1.39 | 1.43 |
| | | | OK | NG(No Good) | OK | NG(No Good) |
| | | Luminance Image | | | | |
| Module | | Light Source Group Arrangement Type | Zigzag Arrangement | Zigzag Arrangement | Zigzag Arrangement | Zigzag Arrangement |
| Configuration of Sample | | Light Source Arrangement Type | | | | | ably arranged in one direction. The light source groups have a spacing between adjacent ones of the light source groups, the spacing increasing gradually from a central portion of the bottom cover to opposite edges of the bottom cover.

BACKLIGHT UNIT

This application claims the benefit of the Korean Patent Application both Nos. 10-2007-0141547, filed on Dec. 31, 2007 and 10-2008-0053576, filed on Jun. 9, 2008 which are hereby incorporated by reference as if fully set forth herein.

BACKGROUND OF THE INVENTION

1. Field of the Invention

The present invention relates to a backlight unit, and more particularly, to a backlight unit capable of using a reduced number of light sources, thereby reducing the manufacturing costs.

2. Discussion of the Related Art

Display devices are classified into an emissive display device such as a cathode ray tube, an organic electro-luminescence display device, or a plasma display device (PDP), which can emit light by itself, and a non-emissive display device such as a liquid crystal display (LCD) device, which cannot generate light by itself, so that it requires a separate light source.

A general LCD device includes two display panels provided with electric field generating electrodes, and a liquid crystal layer interposed between the display panels. The liquid crystal layer has dielectric anisotropy. In the LCD device, an electric field is generated at the liquid crystal layer as a voltage is applied to the electric field generating electrodes. The intensity of the electric field is adjusted as the voltage is varied. In accordance with the adjustment of the electric field intensity, the transmittance of light passing through the liquid crystal layer is controlled. Thus, a desired image is obtained. The light may be light generated from a separate artificial light source provided at the LCD device, or may be natural light.

For the light source of the LCD device, several lamps are typically used. In particular, for a light source capable of uniformly supplying light to the overall portion of the liquid crystal panel at the back surface of the liquid crystal panel, a fluorescent lamp such as an external electrode fluorescent lamp (EEFL) or a cold cathode fluorescent lamp (CCFL), or a light emitting diode (LED) is used.

The most excellent advantage of an LED backlight unit for an LCD device, for which active research and development are currently conducted, is in that it is possible to provide optimal color sensation desired by the user.

However, the LED, which is used for the light source of the backlight unit exhibits an abrupt variation in light efficiency caused by heat. For example, the LED sensitively responds to the external environment or internal heat source of the LCD device, so that the color balance of the LED may collapse.

In particular, the above-mentioned problem is severe in a backlight unit used for a large-size LCD device because the backlight unit uses a large number of LEDs. Furthermore, there is a problem of an increase in the manufacturing costs due to the increased number of LEDs.

SUMMARY OF THE INVENTION

Accordingly, the present invention is directed to a backlight unit that substantially obviates one or more problems due to limitations and disadvantages of the related art.

An object of the present invention is to provide a backlight unit capable of achieving an enhancement in the reliability of light sources used in the backlight unit, a reduction in heat generation, and a reduction in manufacturing costs by adjusting the arrangement of the light sources while reducing the number of the light sources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit comprises: a bottom cover formed with a plurality of light source groups each including a plurality of light sources arranged in one direction, wherein the light source groups have a spacing between adjacent ones of the light source groups, the spacing increasing gradually from a central portion of the bottom cover to opposite edges of the bottom cover.

The backlight unit according to the present invention provides the following effects.

First, it is possible to reduce the number of light sources, and thus to achieve a reduction in the heat generated from the light sources and a reduction in manufacturing costs.

Second, it is possible to reduce the number of light sources included in each light source group because the spacing between the adjacent light source groups increases gradually from the central portion of the bottom cover to the opposite edges of the bottom cover.

Third, it is possible to densely arrange the light sources toward the central portion of the bottom cover by increasing the spacing at the edges of the bottom cover, and thus to achieve a low-current driving operation and a reduction in power consumption.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the principle of the invention. In the drawings:

FIG. 17 is a table showing the results of comparison among backlight units including light sources arranged in different manners, respectively;

DETAILED DESCRIPTION OF THE INVENTION

Reference will now be made in detail to the preferred embodiments of the present invention associated with a backlight unit, examples of which are illustrated in the accompanying drawings.

First Embodiment

Figure 1:
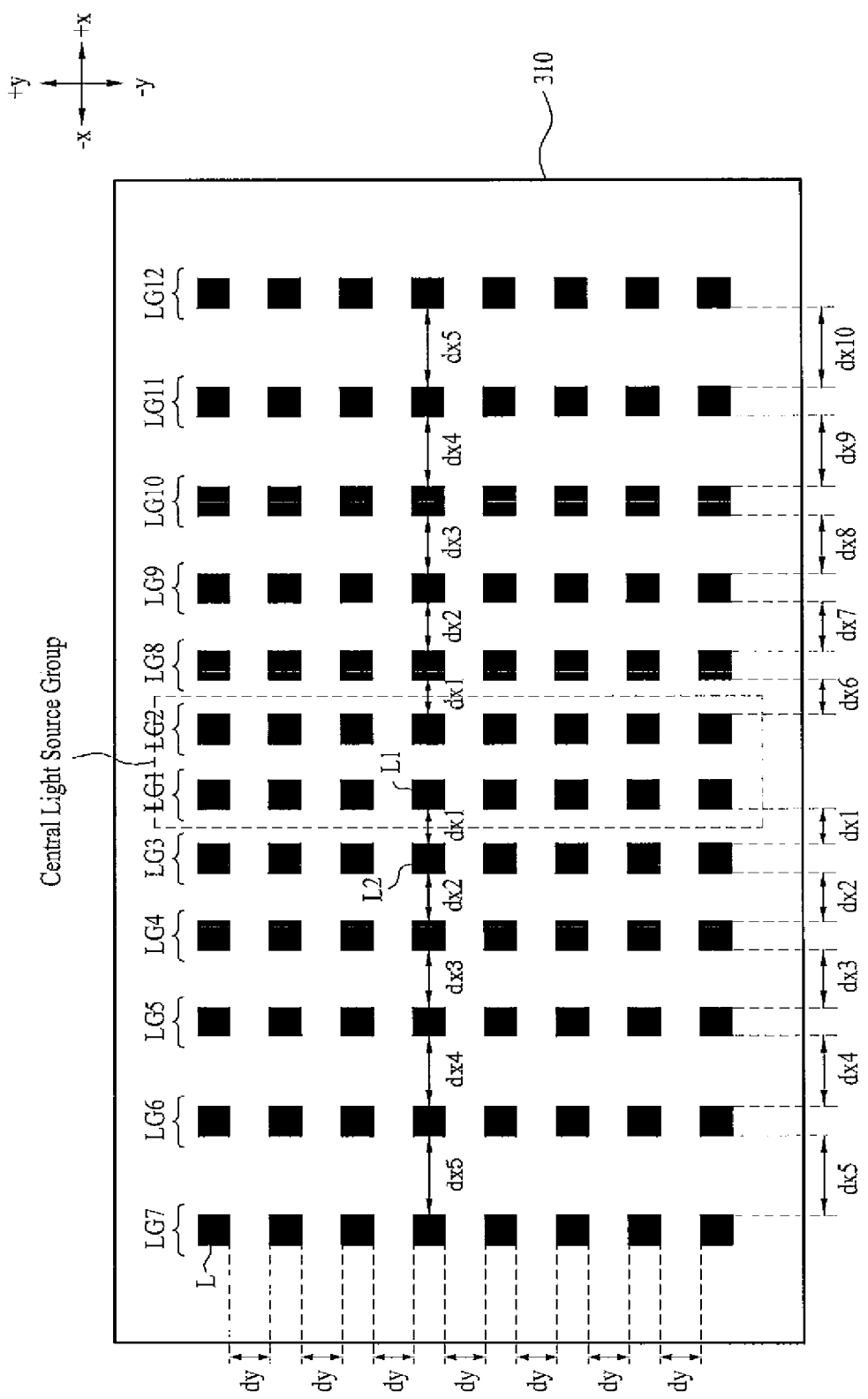
FIG. 1 is a view illustrating a backlight unit according to a first embodiment of the present invention.

FIG. 1 is a view illustrating a backlight unit according to a first embodiment of the present invention.

As shown in FIG. 1, the backlight unit according to the first embodiment of the present invention includes a bottom cover 310 formed with a plurality of light source groups LG1 to LG12 each including a plurality of light sources L arranged in one direction. The spacing between the adjacent ones of the light source groups LG1 to LG12 increases gradually from a central portion of the bottom cover 310 to opposite edges of the bottom cover 310.

The light sources L in each of the light source groups LG1 to LG12 are aligned in a longitudinal direction of shorter sides of the bottom cover 310, namely, a Y-axis direction. The light source groups LG1 to LG12 having the above-described arrangement are arranged in a longitudinal direction of longer sides of the bottom cover 310, namely, an X-axis direction.

As shown in FIG. 1, the light sources L included in each of the light source groups LG1 to LG12 have the same spacing dy between the adjacent light sources L.

The light source groups LG1 to LG12 include the same number of light sources L. The light sources L included in each of the light source groups LG1 to LG12 correspond, one by one, to those of the remaining light source groups. The corresponding light sources L of the light source groups LG1 to LG12 are aligned in the X-axis direction.

The spacing between the corresponding light sources L respectively included in the adjacent ones of the light source groups LG1 to LG12 increases gradually from the central portion of the bottom cover 310 to the opposite edges of the bottom cover 310.

This will be described in more detail.

The light source groups LG1 to LG12 may be divided into a central light source group arranged at the central portion of the bottom cover 310, a plurality of first peripheral light source groups arranged between the central light source group and one edge of the bottom cover 310, and a plurality of second peripheral light source groups arranged between the central light source group and the other edge of the bottom cover 310.

The central light source group includes two light source groups arranged nearest to the central portion of the bottom cover 310. That is, the central light source group includes the first light source group LG1 arranged nearest to one side of the central portion of the bottom cover 310, and the second light source group LG2 arranged nearest to the other side of the central portion of the bottom cover 310.

The first peripheral light source groups include the third to seventh light source groups LG3 to LG7 arranged between the left side of the first light source group LG1 and the left edge of the bottom cover 310. On the other hand, the second peripheral light source groups include the eighth to twelfth light source groups LG8 to LG12 arranged between the right side of the second light source group LG2 and the right edge of the bottom cover 310.

The spacing between the adjacent ones of the central light source group and the first peripheral light source groups increases gradually from the central portion of the bottom cover 310 and one edge of the bottom cover 130. Also, the spacing between the adjacent ones of the central light source group and the second peripheral light sources increases gradually from the central portion of the bottom cover 310 and the other edge of the bottom cover 130.

In other words, the spacing between the adjacent ones of the first, third, fourth, fifth, sixth, and seventh light source groups LG1, LG3, LG4, LG5, LG6, and LG7 increases gradually from the central portion of the bottom cover 310 to one edge of the bottom cover 310. The spacing between the adjacent ones of the second, eighth, ninth, tenth, eleventh, and twelfth light source groups LG2, LG8, LG9, LG10, LG11, and LG12 increases gradually from the central portion of the bottom cover 310 to the other edge of the bottom cover 310.

For example, as shown in FIG. 1, the spacing between the first and third light source groups LG1 and LG3, namely, a first spacing dx1, the spacing between the third and fourth light source groups LG3 and LG4, namely, a second spacing dx2, the spacing between the fourth and fifth light source groups LG4 and LG5, namely, a third spacing dx3, the spacing between the fifth and sixth light source groups LG5 and LG6, namely, a fourth spacing dx4, and the spacing between the sixth and seventh light source groups LG6 and LG7, namely, a fifth spacing dx5, are different from one another. In detail, the first spacing dx1 between the first light source group LG1 nearest to the central portion of the bottom cover 310 and the third light source group LG3 adjacent to the first light source group LG1 is smallest, and the fifth spacing dx5 between the seventh light source group LG7 farthest from the central portion of the bottom cover 310 and the sixth light source group LG6 adjacent to the seventh light source group LG7 is largest. In other words, the second spacing dx2 is larger than the first spacing dx1, the third spacing dx3 is larger than the second spacing dx2, the fourth spacing dx4 is larger than the third spacing dx3, and the fifth spacing dx5 is larger than the fourth spacing dx4.

Similarly, the spacing between the second and eighth light source groups LG2 and LG8, namely, a sixth spacing dx6, the spacing between the eighth and ninth light source groups LG8 and LG9, namely, a seventh spacing dx7, the spacing between the ninth and tenth light source groups LG9 and LG10, namely, an eighth spacing dx8, the spacing between the tenth and eleventh light source groups LG10 and LG11, namely, a ninth spacing dx9, and the spacing between the eleventh and twelfth light source groups LG11 and LG12, namely, a tenth spacing dx10, are different from one another. In detail, the sixth spacing dx6 between the second light source group LG2 nearest to the central portion of the bottom cover 310 and the eighth light source group LG8 adjacent to the second light source group LG2 is smallest, and the tenth spacing dx10 between the twelfth light source group LG12 farthest from the central portion of the bottom cover 310 and the eleventh light source group LG11 adjacent to the twelfth light source group LG12 is largest. In other words, the seventh spacing dx7 is larger than the sixth spacing dx6, the eighth spacing dx8 is larger than the seventh spacing dx7, the ninth spacing dx9 is larger than the eighth spacing dx8, and the tenth spacing dx10 is larger than the ninth spacing dx9.

The first and sixth spacings dx1 and dx6 are equal, the second and seventh spacings dx2 and dx7 are equal, the third and eighth spacings dx3 and dx8 are equal, the fourth and ninth spacings dx4 and dx9 are equal, the fifth and tenth spacings dx5 and dx10 are equal.

Of course, the first and sixth spacings dx1 and dx6 may be set to be different from each other, the second and seventh spacings dx2 and dx7 may be set to be different from each other, the third and eighth spacings dx3 and dx8 may be set to be different from each other, the fourth and ninth spacings dx4 and dx9 may be set to be different from each other, and the fifth and tenth spacings dx5 and dx10 may be set to be different from each other.

The spacings may increase from one another at a predetermined increase rate.

For example, the second spacing dx2 may be larger than the first spacing dx1 by 0.2 mm. The third spacing dx2 may be larger than the second spacing dx2 by 0.2 mm. The fourth spacing dx4 may be larger than the third spacing dx3 by 0.2 mm. The fifth spacing dx5 may be larger than the fourth spacing dx4 by 0.2 mm. The sixth to tenth spacings dx6 to dx10 may increase from one another at the same increase rate as the above-described increase rate.

Meanwhile, the spacing between the first and second light source groups LG1 and LG2 may be equal to the spacing between the first and third light source groups LG1 and LG3.

The above-described spacing means the spacing between the light sources L included in the adjacent, different light source groups while corresponding to each other. For example, the first spacing dx1 means the spacing between one light source L1 included in the first light source group LG1 and one light source L2 included in the second light source group LG2 while corresponding to the light source L1.

Second Embodiment

Figure 2:
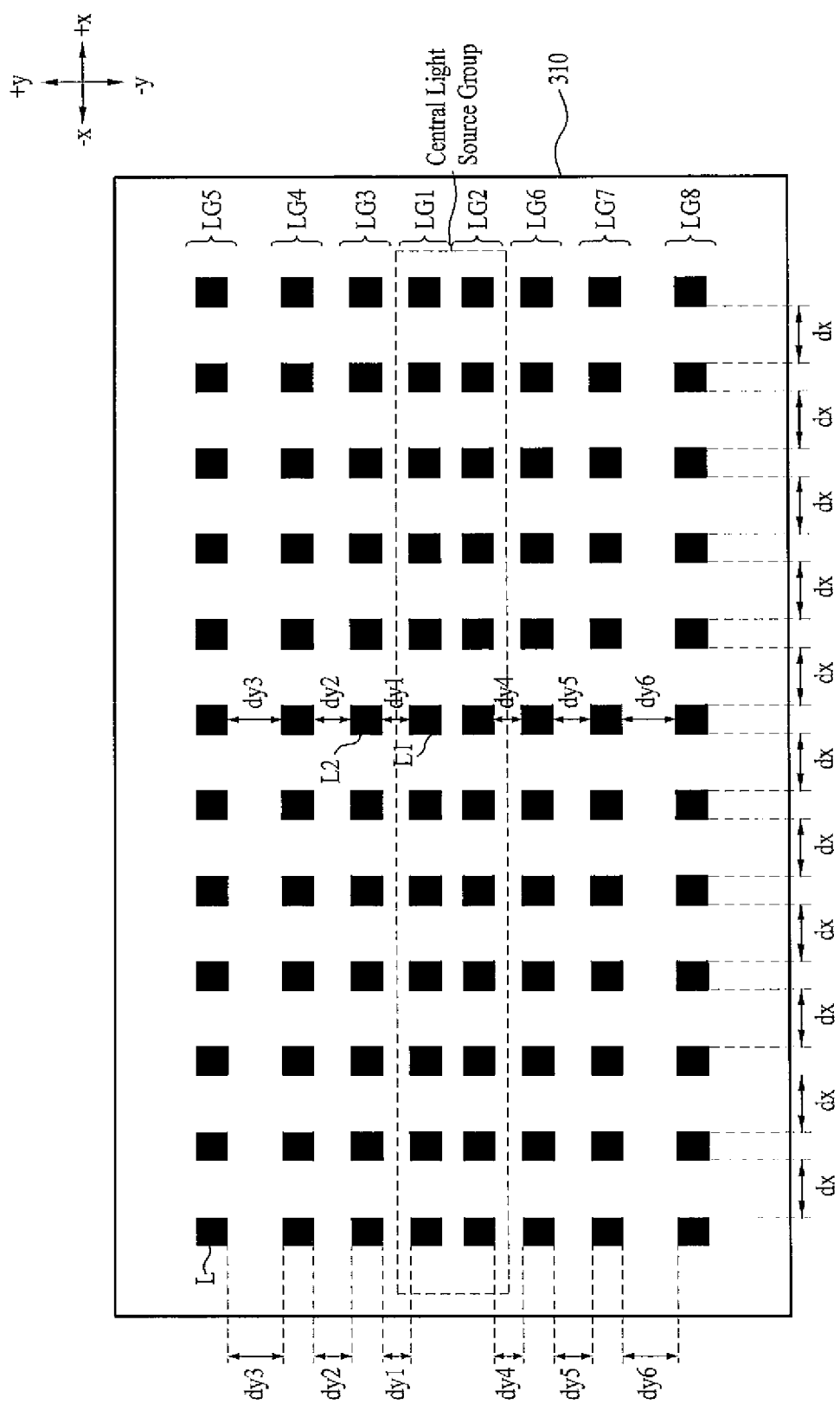
FIG. 2 is a view illustrating a backlight unit according to a second embodiment of the present invention.

FIG. 2 is a view illustrating a backlight unit according to a second embodiment of the present invention.

As shown in FIG. 2, the backlight unit according to the second embodiment of the present invention includes light source groups LG1 to LG8 each including a plurality of light sources L aligned in the longitudinal direction of the longer sides of the bottom cover 310, namely, the X-axis direction. The light source groups LG1 to LG8 having the above-described arrangement are arranged in a longitudinal direction of the shorter sides of the bottom cover 310, namely, the Y-axis direction.

As shown in FIG. 2, the light sources L included in each of the light source groups LG1 to LG8 have the same spacing dx between the adjacent light sources L.

The light source groups LG1 to LG8 include the same number of light sources L. The light sources L included in each of the light source groups LG1 to LG8 correspond, one by one, to those of the remaining light source groups. The corresponding light sources L of the light source groups LG1 to LG8 are aligned in the Y-axis direction.

The spacing between the corresponding light sources L respectively included in the adjacent ones of the light source groups LG1 to LG8 increases gradually from the central portion of the bottom cover 310 to the opposite edges of the bottom cover 310.

This will be described in more detail.

The light source groups LG1 to LG8 may be divided into a central light source group arranged at the central portion of the bottom cover 310, a plurality of first peripheral light source groups arranged between the central light source group and one edge of the bottom cover 310, and a plurality of second peripheral light source groups arranged between the central light source group and the other edge of the bottom cover 310.

The central light source group includes two light source groups arranged nearest to the central portion of the bottom cover 310. That is, the central light source group includes the first light source group LG1 arranged nearest to one side of the central portion of the bottom cover 310, and the second light source group LG2 arranged nearest to the other side of the central portion of the bottom cover 310.

The first peripheral light source groups include the third to fifth light source groups LG3 to LG5 arranged between the upper side of the first light source group LG1 and the upper edge of the bottom cover 310. On the other hand, the second peripheral light source groups include the sixth to eighth light source groups LG6 to LG8 arranged between the lower side of the second light source group LG2 and the lower edge of the bottom cover 310.

The spacing between the adjacent ones of the central light source group and the first peripheral light source groups increases gradually from the central portion of the bottom cover 310 and the upper edge of the bottom cover 130. Also, the spacing between the adjacent ones of the central light source group and the second peripheral light sources increases gradually from the central portion of the bottom cover 310 and the lower edge of the bottom cover 130.

In other words, the spacing between the adjacent ones of the first, third, fourth, and fifth light source groups LG1, LG3, LG4, and LG5 increases gradually from the central portion of the bottom cover 310 to the upper edge of the bottom cover 310. The spacing between the adjacent ones of the second, sixth, seventh, and eighth light source groups LG2, LG6, LG7, and LG8 increases gradually from the central portion of the bottom cover 310 to the lower edge of the bottom cover 310.

For example, as shown in FIG. 2, the spacing between the first and third light source groups LG1 and LG3, namely, a first spacing dy1, the spacing between the third and fourth light source groups LG3 and LG4 namely, a second spacing dy2, and the spacing between the fourth and fifth light source groups LG4 and LG5, namely, a third spacing dy3, are different from one another. In detail, the first spacing dy1 between the first light source group LG1 nearest to the central portion of the bottom cover 310 and the third light source group LG3 adjacent to the first light source group LG1 is smallest, and the third spacing dy3 between the fifth light source group LG5 farthest from the central portion of the bottom cover 310 and the fourth light source group LG4 adjacent to the fifth light source group LG5 is largest. In other words, the second spacing dy2 is larger than the first spacing dy1, and the third spacing dy3 is larger than the second spacing dy2.

Similarly, the spacing between the second and sixth light source groups LG2 and LG6, namely, a fourth spacing dy4, the spacing between the sixth and seventh light source groups LG6 and LG7, namely, a fifth spacing dy5, and the spacing between the seventh and eighth light source groups LG7 and LG8, namely, a sixth spacing dy6, are different from one another. In detail, the fourth spacing dy4 between the second light source group LG2 nearest to the central portion of the bottom cover 310 and the sixth light source group LG6 adjacent to the second light source group LG2 is smallest, and the eighth spacing dy8 between the eighth light source group LG8 farthest from the central portion of the bottom cover 310 and the seventh light source group LG7 adjacent to the eighth light source group LG8 is largest. In other words, the fifth spacing dy5 is larger than the fourth spacing dy4, and the sixth spacing dy6 is larger than the fifth spacing dy5

The first and fourth spacings dy1 and dy4 are equal, the second and fifth spacings dy2 and dy5 are equal, and the third and sixth spacings dy3 and dy6 are equal.

Of course, the first and fourth spacings dy1 and dy4 may be set to be different from each other, the second and fifth spacings dy2 and dy5 may be set to be different from each other, and the third and sixth spacings dy3 and dy6 may be set to be different from each other.

The spacings may increase from one another at a predetermined increase rate.

For example, the second spacing dy2 may be larger than the first spacing dy1 by 0.2 mm. The third spacing dy2 may be larger than the second spacing dy2 by 0.2 mm. The fourth to sixth spacings dy4 to dy6 may increase from one another at the same increase rate as the above-described increase rate.

Meanwhile, the spacing between the first and second light source groups LG1 and LG2 may be equal to the spacing between the first and third light source groups LG1 and LG3.

The above-described spacing means the spacing between the light sources L included in the adjacent, different light source groups while corresponding to each other. For example, the first spacing dy1 means the spacing between one light source L1 included in the first light source group LG1 and one light source L2 included in the second light source group LG2 while corresponding to the light source L1.

Third Embodiment

Figure 3:
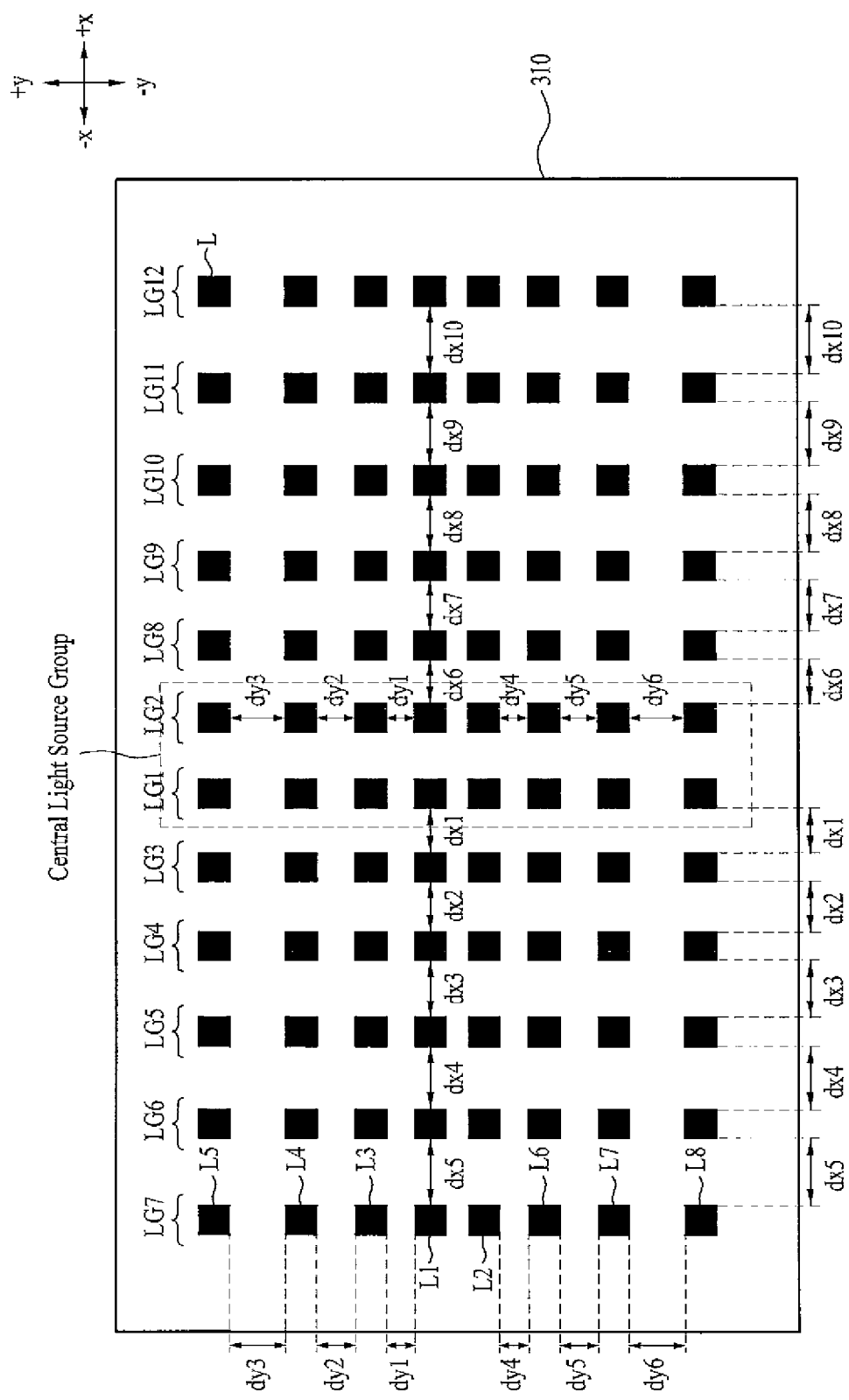
FIG. 3 is a view illustrating a backlight unit according to a third embodiment of the present invention.

FIG. 3 is a view illustrating a backlight unit according to a third embodiment of the present invention.

As shown in FIG. 3, the backlight unit according to the first embodiment of the present invention includes a bottom cover 310 formed with a plurality of light source groups LG1 to LG12 each including a plurality of light sources L arranged in one direction The spacing between the adjacent ones of the light source groups LG1 to LG12 increases gradually from a central portion of the bottom cover 310 to opposite edges of the bottom cover 310.

The light sources L in each of the light source groups LG1 to LG12 are aligned in a longitudinal direction of shorter sides of the bottom cover 310, namely, a Y-axis direction. The light source groups LG1 to LG12 having the above-described arrangement are arranged in a longitudinal direction of longer sides of the bottom cover 310, namely, an X-axis direction.

The light source groups LG1 to LG12 include the same number of light sources L. The light sources L included in each of the light source groups LG1 to LG12 correspond, one by one, to those of the remaining light source groups. The corresponding light sources L of the light source groups LG1 to LG12 are aligned in the X-axis direction.

The spacing between the corresponding light sources L respectively included in the adjacent ones of the light source groups LG1 to LG12 increases gradually from the central portion of the bottom cover 310 to the opposite edges of the bottom cover 310. Details of this arrangement can be apparent from the description of the first embodiment.

Meanwhile, the spacing between the adjacent ones of the light sources L included in each of the light source groups LG1 to LG8 increases gradually from the central portion of the bottom cover 310 to the opposite edges of the bottom cover 310.

When it is assumed that, for example, the first light source group LG1 includes first to eighth light sources L1 to L8, the spacing between the first and third light sources L1 and L3, namely, a first spacing dy1, the spacing between the third and fourth light sources L3 and L4, namely, a second spacing dy2, and the spacing between the fourth and fifth light sources L4 and L5, a third spacing dy3, are different from one another. In detail, the first spacing dy1 between the first light source L1 nearest to the central portion of the first light source group LG1 in one direction and the second light source L2 adjacent to the first light source L1 is smallest, and the third spacing dy3 between the fifth light source L5 farthest from the central portion of the first light source group LG1 in one direction and the fourth light source L4 adjacent to the fifth light source L5 is largest. In other words, the second spacing dy2 is larger than the first spacing dy1, and the third spacing dy3 is larger than the second spacing dy2.

Similarly, the spacing between the second and sixth light sources L2 and L6, namely, a fourth spacing dy4, the spacing between the sixth and seventh light sources L6 and L7, namely, a fifth spacing dy5, and the spacing between the seventh and eighth light sources L7 and L8, a sixth spacing dy6, are different from one another. In detail, the fourth spacing dy4 between the second light source L2 nearest to the central portion of the first light source group LG1 in the other direction and the sixth light source L6 adjacent to the second light source L2 is smallest, and the sixth spacing dy6 between the eighth light source L8 farthest from the central portion of the first light source group LG1 in one direction and the seventh light source L7 adjacent to the eighth light source L8 is largest. In other words, the fifth spacing dy5 is larger than the fourth spacing dy4, and the sixth spacing dy6 is larger than the fifth spacing dy5.

The first and fourth spacings dy1 and dy4 are equal, the second and fifth spacings dy2 and dy5 are equal, and the third and sixth spacings dy3 and dy6 are equal.

Of course, the first and fourth spacings dy1 and dy4 may be set to be different from each other, the second and fifth spacings dy2 and dy5 may be set to be different from each other, and the third and sixth spacings dy3 and dy6 may be set to be different from each other.

The increase rate of the spacing between the light sources L included in the adjacent, different light source groups while corresponding to each other and the increase rate of the spacing between the adjacent light sources L included in each light source group may be equal or different.

For example, where the increase rate of the spacing between the light sources L included in the adjacent, different light source groups while corresponding to each other is 0.2 mm, as described above, the increase rate of the spacing between the adjacent light sources L included in each light source group may be 0.2 mm or may have other values.

Fourth Embodiment

Figure 4:
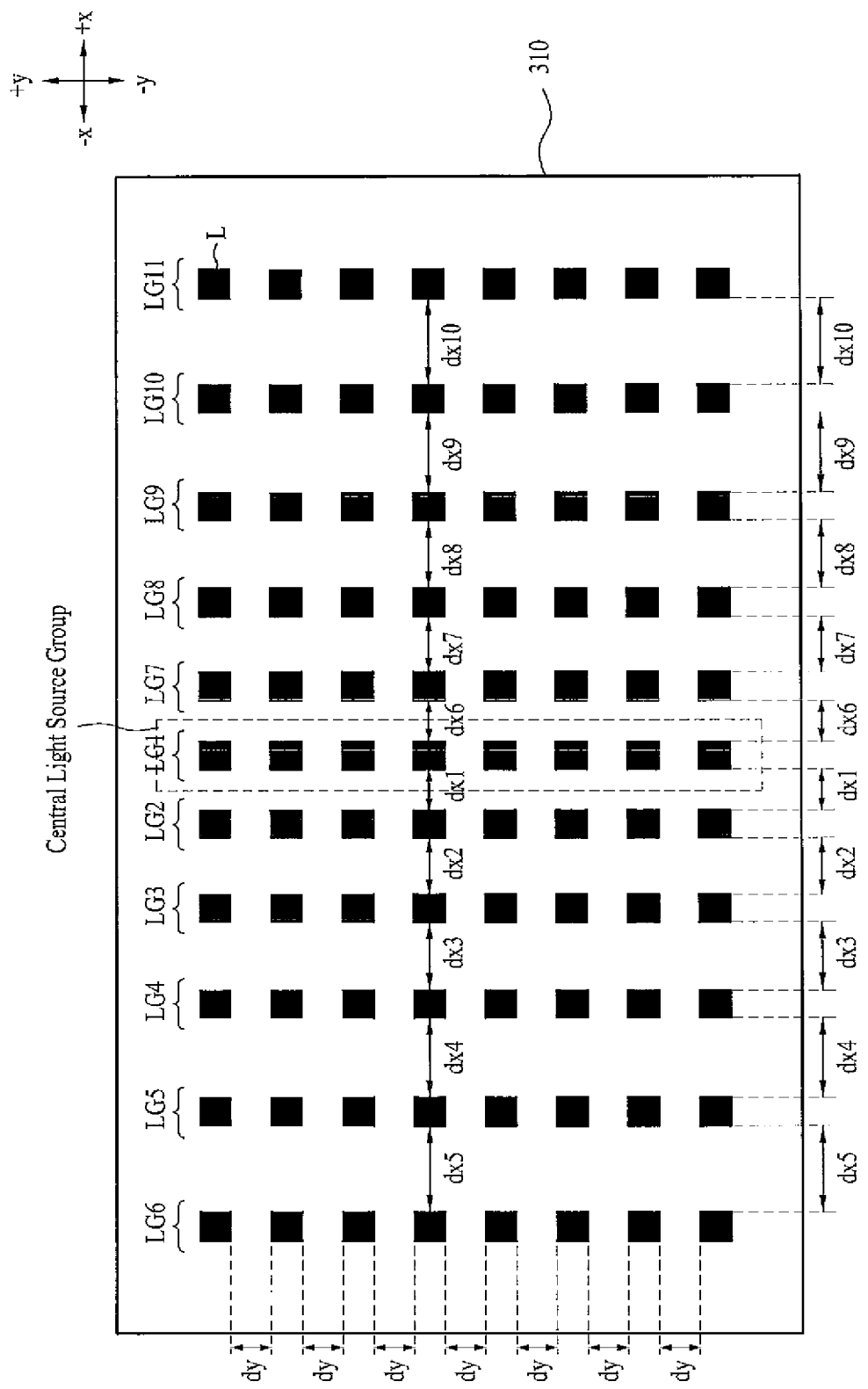
FIG. 4 is a view illustrating a backlight unit according to a fourth embodiment of the present invention.

FIG. 4 is a view illustrating a backlight unit according to a fourth embodiment of the present invention.

The backlight unit according to the fourth embodiment of the present invention is similar to the first embodiment shown in FIG. 1. However, the central light source group in the backlight unit according to the fourth embodiment of the present invention includes a single light source group, and the single light source group, namely, the first light source group LG1, is arranged along a central line dividing the bottom cover 310 into left and right half portions.

The remaining configuration is identical to that of the first embodiment. Accordingly, details of the remaining configuration can be apparent from the description of the first embodiment.

Fifth Embodiment

Figure 5:
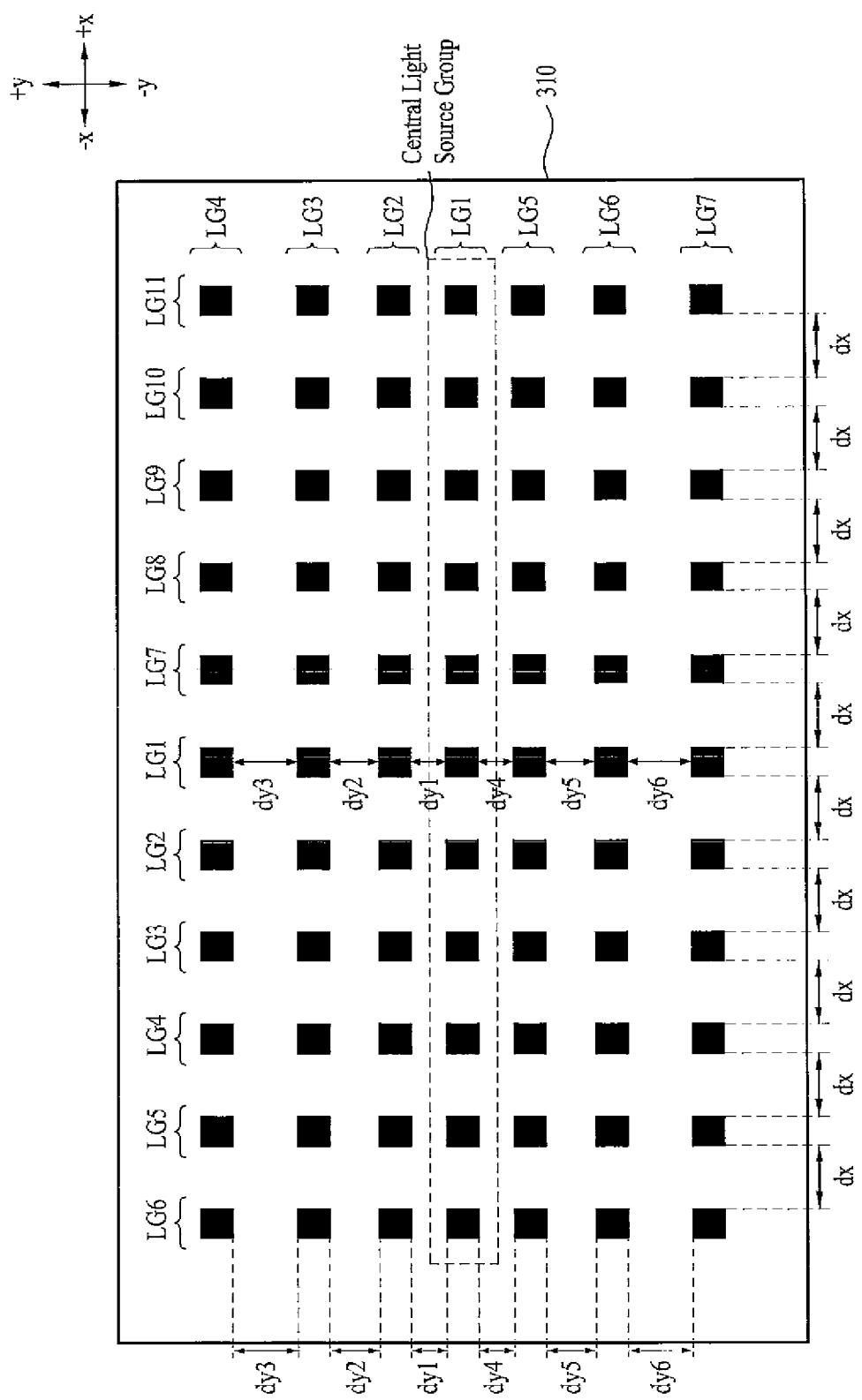
FIG. 5 is a view illustrating a backlight unit according to a fifth embodiment of the present invention.

FIG. 5 is a view illustrating a backlight unit according to a fifth embodiment of the present invention.

The backlight unit according to the fifth embodiment of the present invention is similar to the second embodiment shown in FIG. 2. However, the central light source group in the backlight unit according to the fifth embodiment of the present invention includes a single light source group, and the single light source group, namely, the first light source group LG1, is arranged along a central line dividing the bottom cover 310 into upper and lower half portions.

The remaining configuration is identical to that of the second embodiment.

Accordingly, details of the remaining configuration can be apparent from the description of the second embodiment.

Sixth Embodiment

Figure 6:
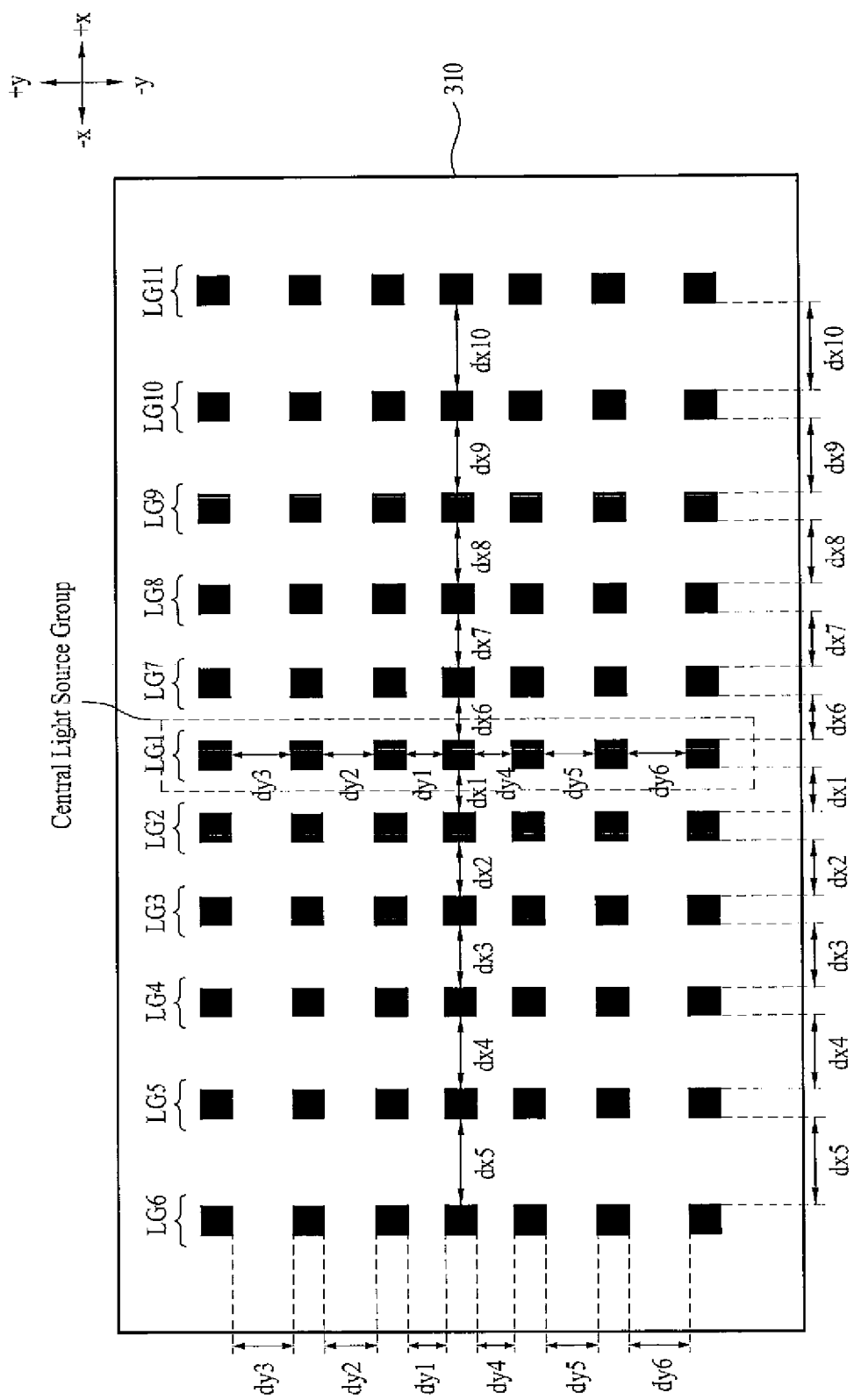
FIG. 6 is a view illustrating a backlight unit according to a sixth embodiment of the present invention.

FIG. 6 is a view illustrating a backlight unit according to a sixth embodiment of the present invention.

The backlight unit according to the sixth embodiment of the present invention is similar to the third embodiment shown in FIG. 3. However, the central light source group in the backlight unit according to the sixth embodiment of the present invention includes a single light source group, and the single light source group, namely, the first light source group LG1, is arranged along a central line dividing the bottom cover 310 into left and right half portions.

The remaining configuration is identical to that of the third embodiment. Accordingly, details of the remaining configuration can be apparent from the description of the third embodiment.

Seventh Embodiment

Figure 7:
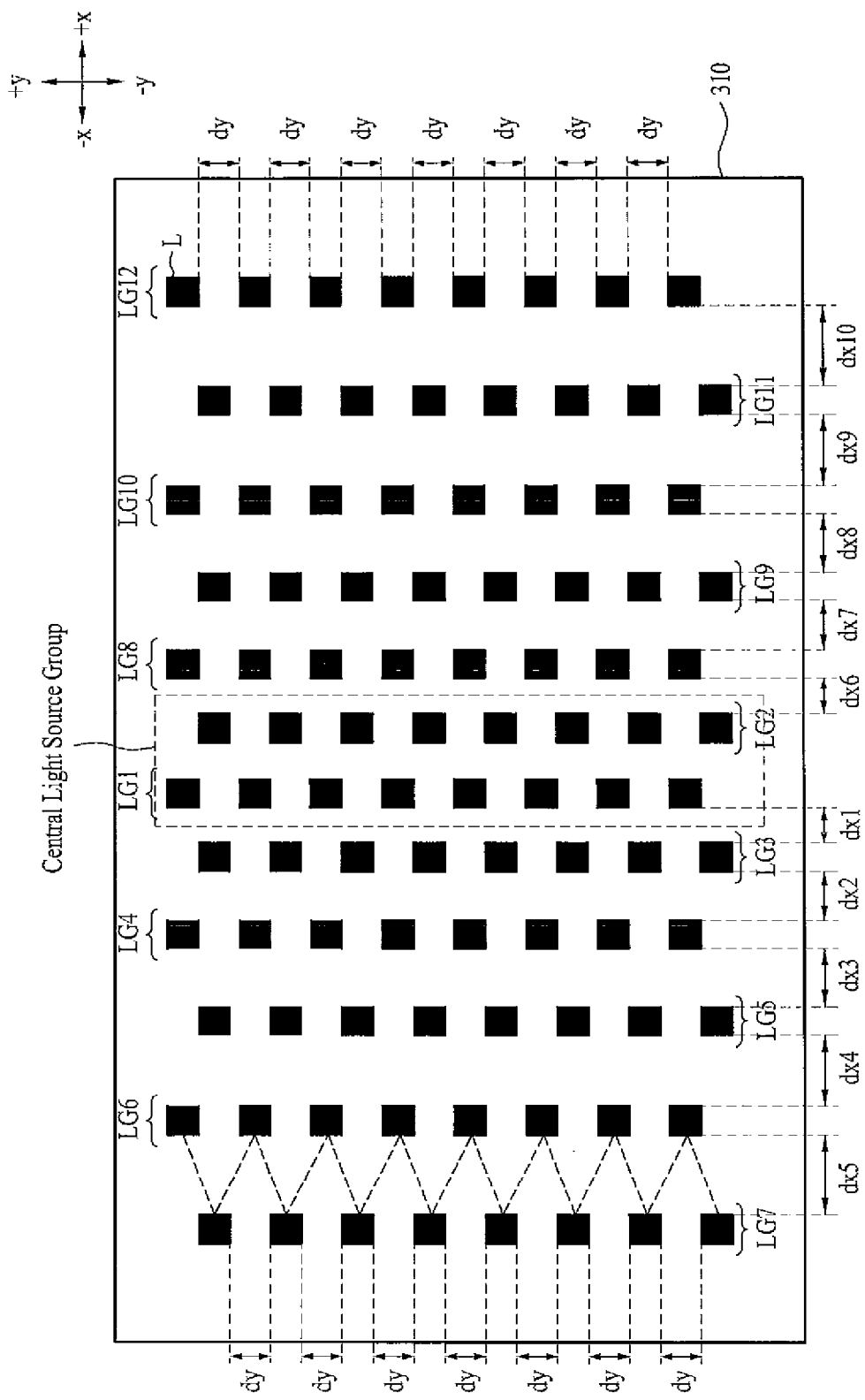
FIG. 7 is a view illustrating a backlight unit according to a seventh embodiment of the present invention

FIG. 7 is a view illustrating a backlight unit according to a seventh embodiment of the present invention.

The backlight unit according to the seventh embodiment of the present invention is similar to the first embodiment shown in FIG. 1. In the backlight unit according to the seventh embodiment of the present invention, however, the light sources L included in the adjacent light source groups are arranged in a zigzag manner, as shown in FIG. 7. That is, the light sources L included in each odd light source group are shifted such that they are closer to the lower edge of the bottom cover 310 than the light sources L included in each even light source group.

The remaining configuration is identical to that of the first embodiment. Accordingly, details of the remaining configuration can be apparent from the description of the first embodiment.

Eighth Embodiment

Figure 8:
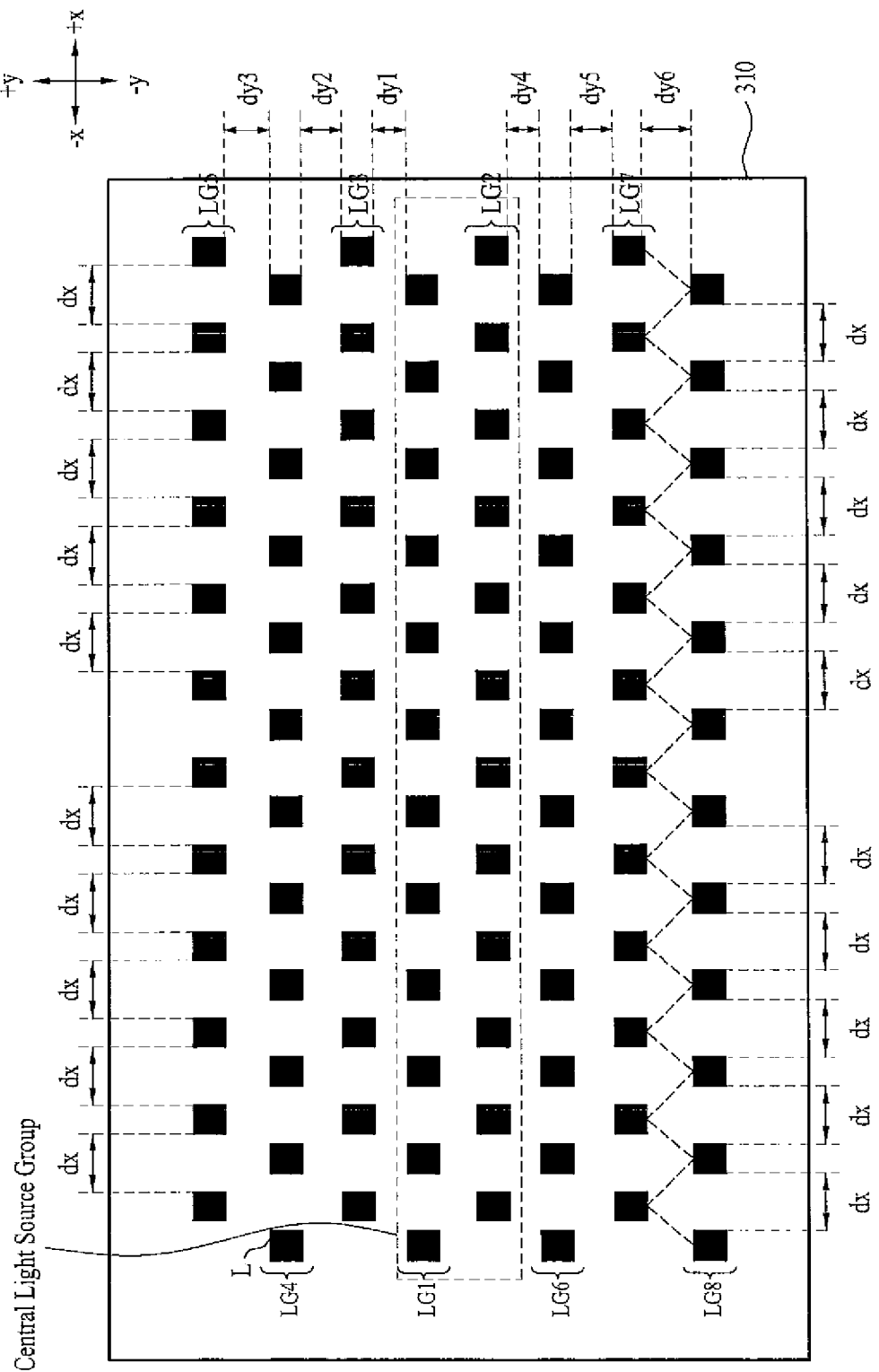
FIG. 8 is a view illustrating a backlight unit according to an eighth embodiment of the present invention.

FIG. 8 is a view illustrating a backlight unit according to an eighth embodiment of the present invention.

The backlight unit according to the eighth embodiment of the present invention is similar to the second embodiment shown in FIG. 2. In the backlight unit according to the eighth embodiment of the present invention, however, the light sources L included in the adjacent light source groups are arranged in a zigzag manner, as shown in FIG. 8. That is, the light sources L included in each odd light source group are shifted such that they are closer to the right edge of the bottom cover 310 than the light sources L included in each even light source group.

The remaining configuration is identical to that of the second embodiment. Accordingly, details of the remaining configuration can be apparent from the description of the second embodiment.

Ninth Embodiment

Figure 9:
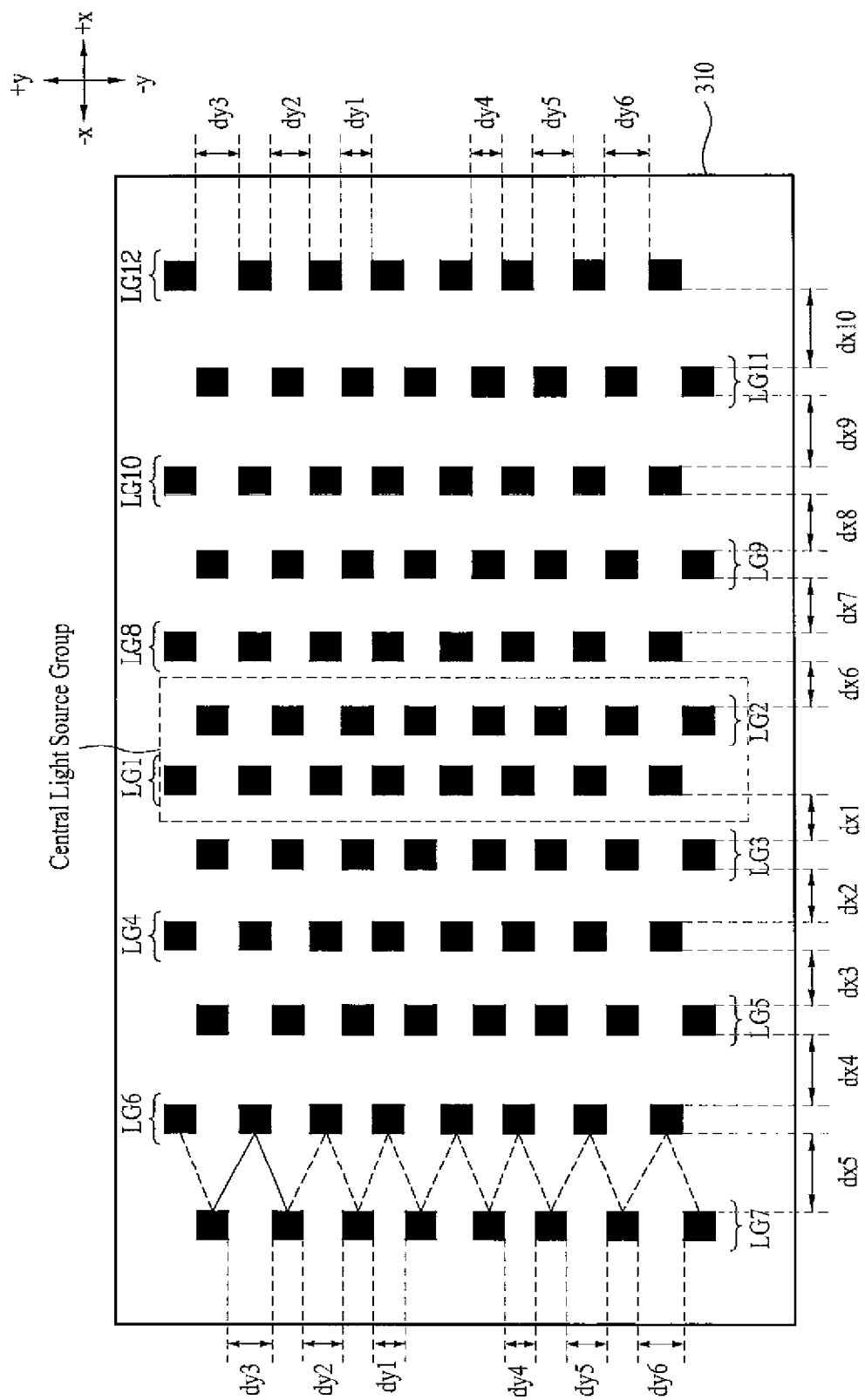
FIG. 9 is a view illustrating a backlight unit according to a ninth embodiment of the present invention.

FIG. 9 is a view illustrating a backlight unit according to a ninth embodiment of the present invention.

The backlight unit according to the ninth embodiment of the present invention is similar to the third embodiment shown in FIG. 3. In the backlight unit according to the ninth embodiment of the present invention, however, the light sources L included in the adjacent light source groups are arranged in a zigzag manner, as shown in FIG. 9. That is, the light sources L included in each odd light source group are shifted such that they are closer to the lower edge of the bottom cover 310 than the light sources L included in each even light source group.

The remaining configuration is identical to that of the third embodiment. Accordingly, details of the remaining configuration can be apparent from the description of the third embodiment.

Tenth Embodiment

Figure 10:
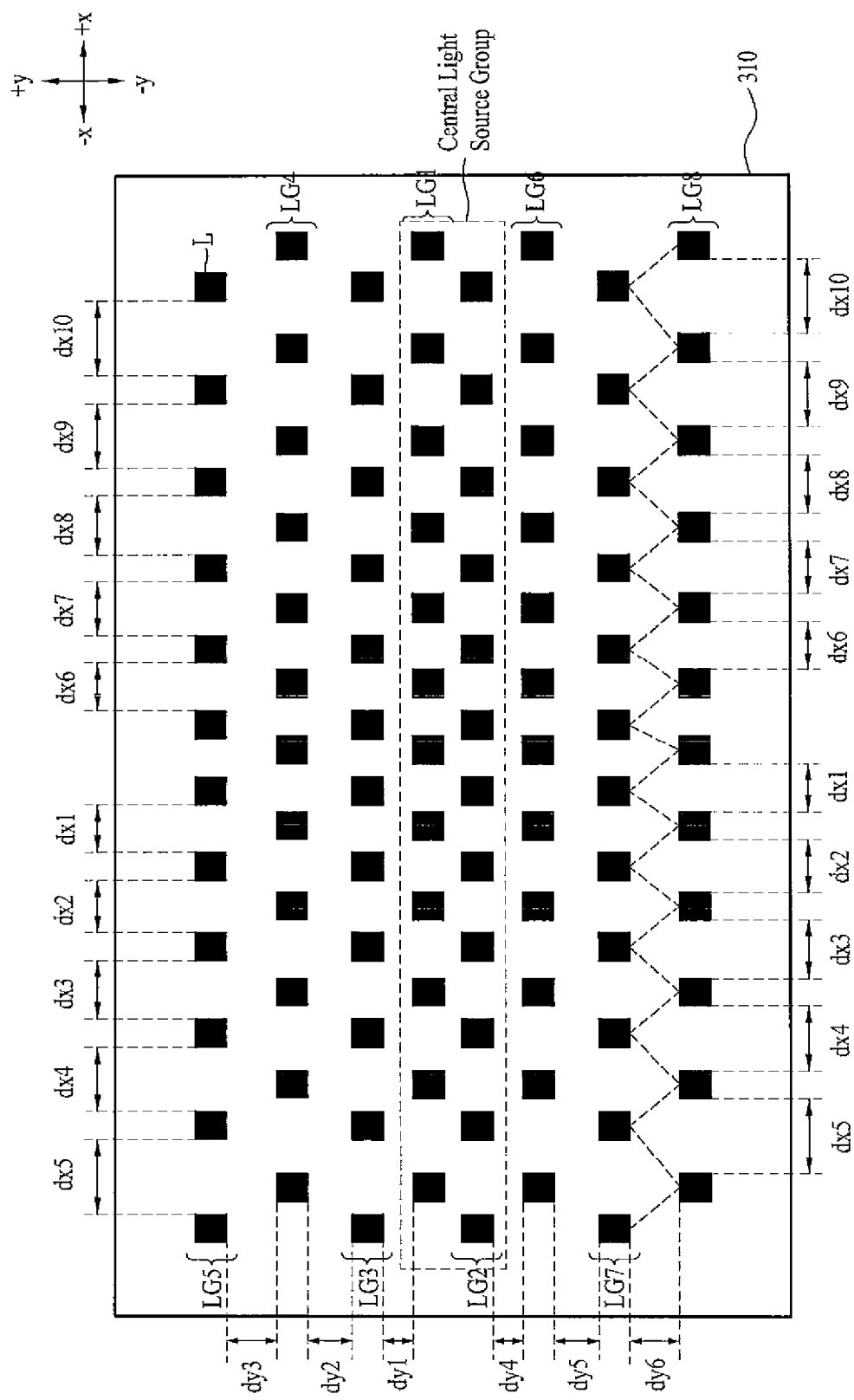
FIG. 10 is a view illustrating a backlight unit according to a tenth embodiment of the present invention.

FIG. 10 is a view illustrating a backlight unit according to a tenth embodiment of the present invention.

The backlight unit according to the tenth embodiment of the present invention is similar to the third embodiment shown in FIG. 3. In the backlight unit according to the tenth embodiment of the present invention, however, the light sources L included in the adjacent light source groups are arranged in a zigzag manner, as shown in FIG. 10. That is, the light sources L included in each odd light source group are shifted such that they are closer to the left edge of the bottom cover 310 than the light sources L included in each even light source group.

The remaining configuration is identical to that of the third embodiment. Accordingly, details of the remaining configuration can be apparent from the description of the third embodiment.

Eleventh Embodiment

Figure 11:
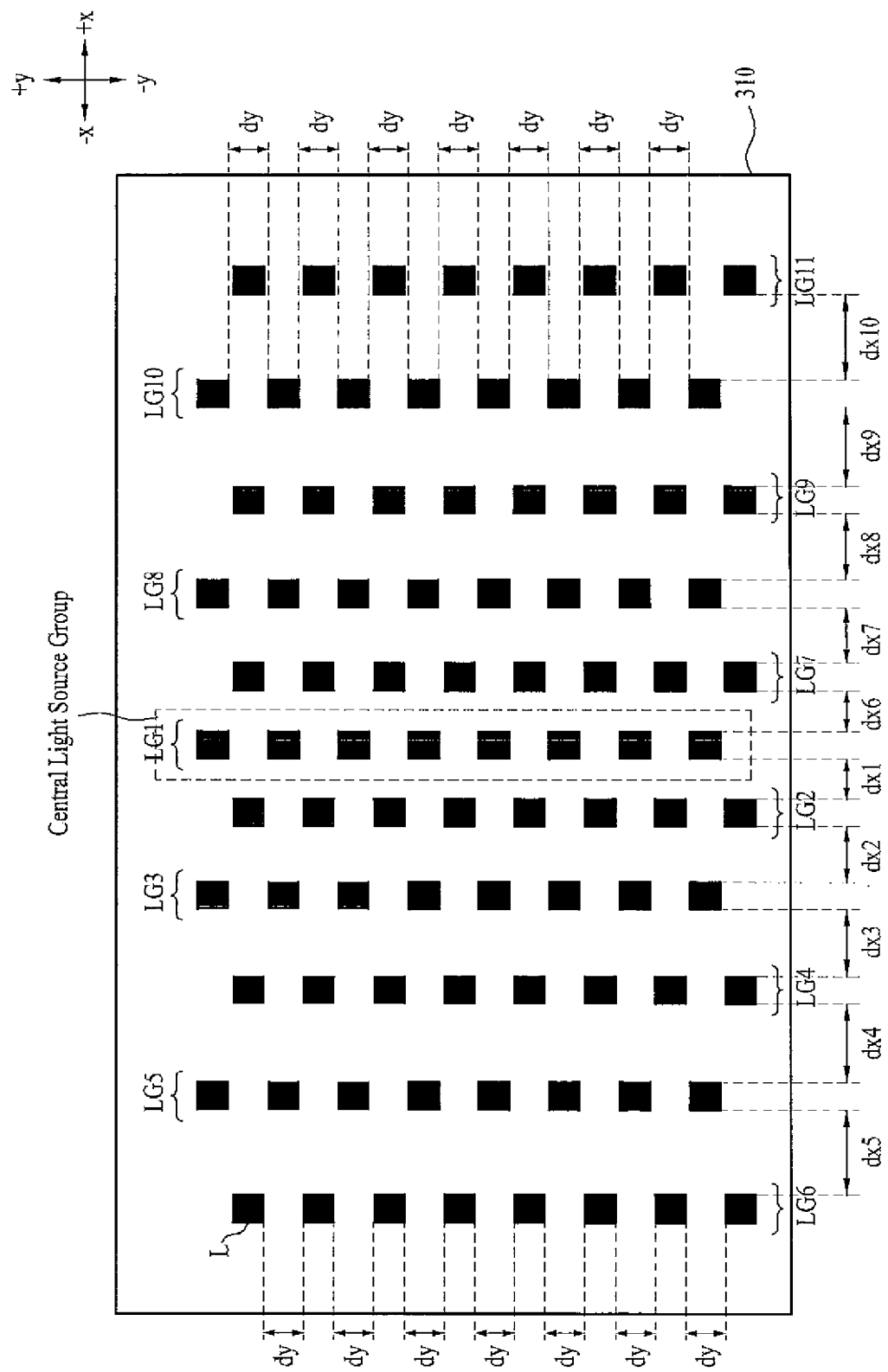
FIG. 11 is a view illustrating a backlight unit according to an eleventh embodiment of the present invention.

FIG. 11 is a view illustrating a backlight unit according to an eleventh embodiment of the present invention.

The backlight unit according to the eleventh embodiment of the present invention is similar to the fourth embodiment shown in FIG. 4. In the backlight unit according to the eleventh embodiment of the present invention, however, the light sources L included in the adjacent light source groups are arranged in a zigzag manner, as shown in FIG. 11. That is, the light sources L included in each odd light source group are shifted such that they are closer to the lower edge of the bottom cover 310 than the light sources L included in each even light source group.

The remaining configuration is identical to that of the fourth embodiment. Accordingly, details of the remaining configuration can be apparent from the description of the fourth embodiment.

Twelfth Embodiment

Figure 12:
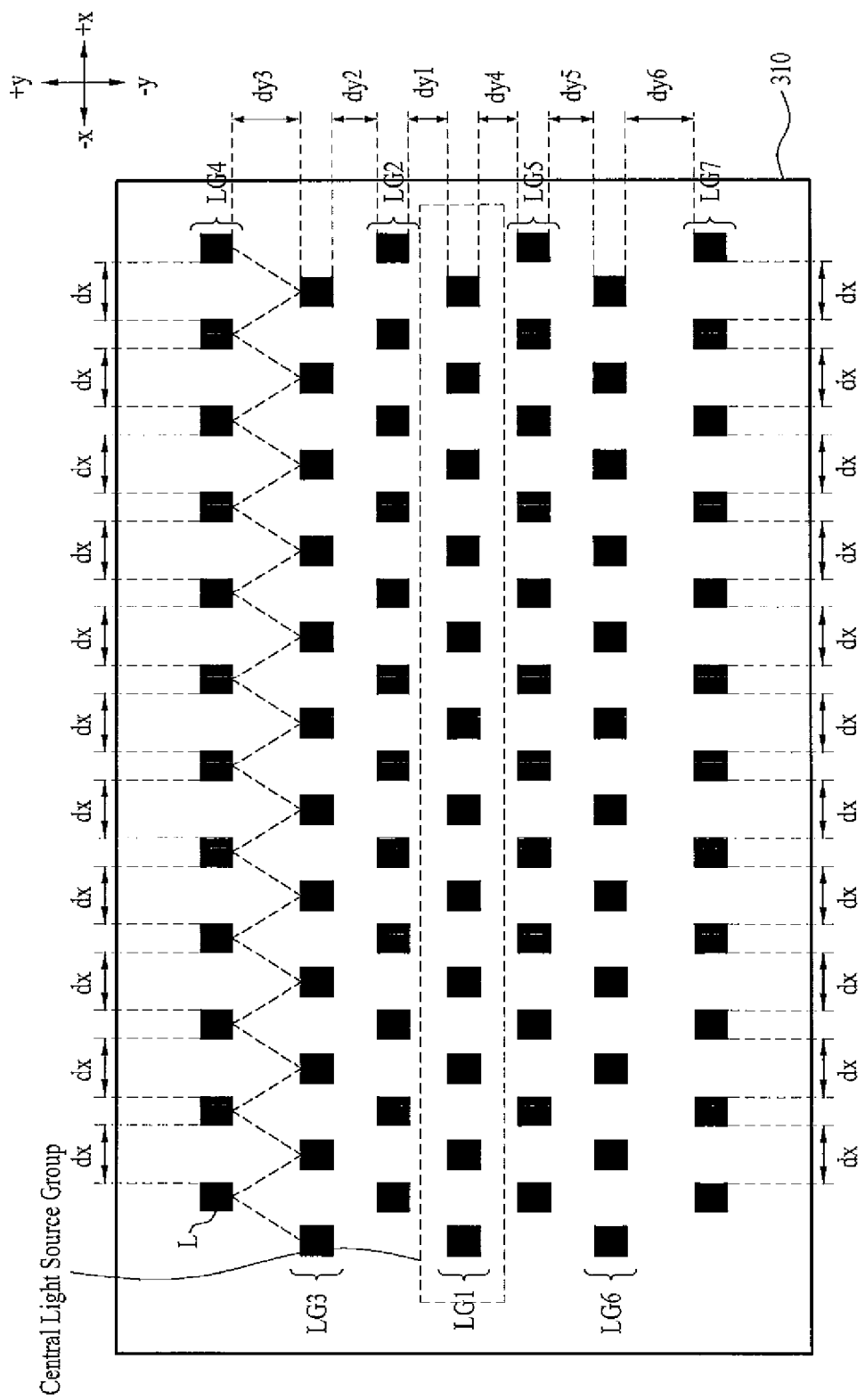
FIG. 12 is a view illustrating a backlight unit according to a twelfth embodiment of the present invention.

FIG. 12 is a view illustrating a backlight unit according to a twelfth embodiment of the present invention.

The backlight unit according to the twelfth embodiment of the present invention is similar to the fifth embodiment shown in FIG. 5. In the backlight unit according to the twelfth embodiment of the present invention, however, the light sources L included in the adjacent light source groups are arranged in a zigzag manner, as shown in FIG. 12. That is, the light sources L included in each odd light source group are shifted such that they are closer to the right edge of the bottom cover 310 than the light sources L included in each even light source group.

The remaining configuration is identical to that of the fifth embodiment. Accordingly, details of the remaining configuration can be apparent from the description of the fifth embodiment.

Thirteenth Embodiment

Figure 13:
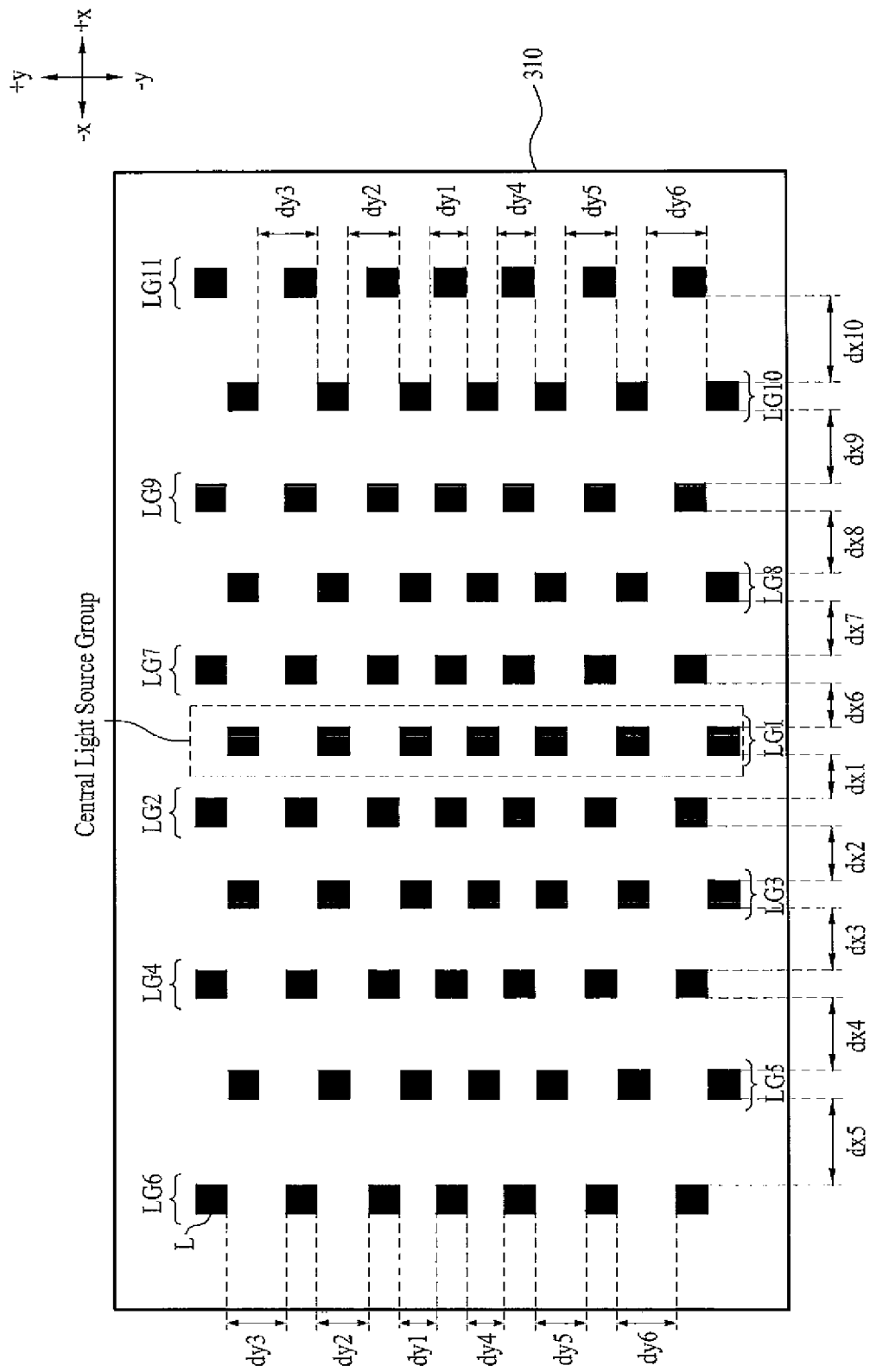
FIG. 13 is a view illustrating a backlight unit according to a thirteenth embodiment of the present invention.

FIG. 13 is a view illustrating a backlight unit according to a thirteenth embodiment of the present invention.

The backlight unit according to the thirteenth embodiment of the present invention is similar to the sixth embodiment shown in FIG. 6. In the backlight unit according to the thirteenth embodiment of the present invention, however, the light sources L included in the adjacent light source groups are arranged in a zigzag manner, as shown in FIG. 13. That is, the light sources L included in each odd light source group are shifted such that they are closer to the upper edge of the bottom cover 310 than the light sources L included in each even light source group.

The remaining configuration is identical to that of the sixth embodiment. Accordingly, details of the remaining configuration can be apparent from the description of the sixth embodiment.

Fourteenth Embodiment

Figure 14:
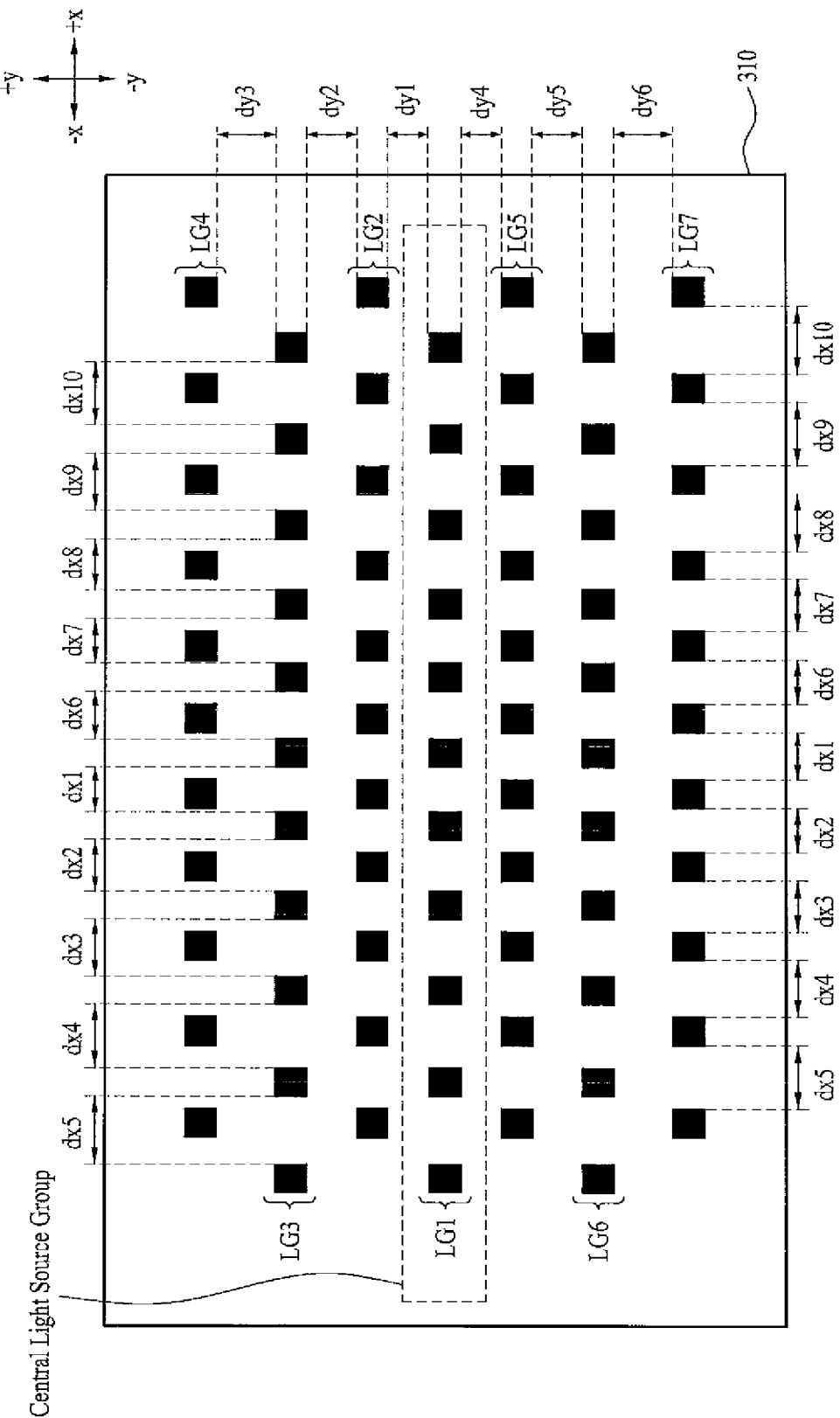
FIG. 14 is a view illustrating a backlight unit according to a fourteenth embodiment of the present invention.

FIG. 14 is a view illustrating a backlight unit according to a fourteenth embodiment of the present invention.

The backlight unit according to the fourteenth embodiment of the present invention is similar to the sixth embodiment shown in FIG. 6. In the backlight unit according to the fourteenth embodiment of the present invention, however, the light sources L included in the adjacent light source groups are arranged in a zigzag manner, as shown in FIG. 14. That is, the light sources L included in each odd light source group are shifted such that they are closer to the right edge of the bottom cover 310 than the light sources L included in each even light source group.

The remaining configuration is identical to that of the sixth embodiment. Accordingly, details of the remaining configuration can be apparent from the description of the sixth embodiment.

The light sources L described in conjunction with the first to fourteenth embodiments are point light sources. For each light source L, a light emitting diode (LED) may be used. In detail, each light source L is a light source emitting white. In this case, for each light source L, a blue LED coated with a phosphor on a light emitting surface. Alternatively, for each light source L, a three-color LED having an integrated structure of red, green, and blue LEDs may be used.

Practically, each light source has the form of a package including an LED as described above, and a circuit for driving the LED.

Meanwhile, although the number of light source groups and the number of light sources in each light source group have been described as being limited to specific values, respectively, for convenience of description, they are variable.

In accordance with the present invention, since the spacing between the adjacent light source groups increases gradually from the central portion of the bottom cover 310 to opposite edges of the bottom cover 310, it is possible to secure luminance at the level of a cold cathode fluorescent lamp (CCFL) while reducing the number of light sources L, as compared to conventional cases. Accordingly, it is possible to avoid luminance degradation caused by a reduction in the number of light sources L, while reducing the manufacturing costs.

Meanwhile, in order to compensate for a reduction in luminance caused by a reduction in the number of light sources L, current supplied to the light sources L may increase gradually from the central portion of the bottom cover 310 to opposite edges of the bottom cover 310, In this case, accordingly, uniform luminance can be obtained such that the luminance of the light sources L arranged at the central portion of the bottom cover 310 and the luminance of the light sources L arranged at the edges of the bottom cover 310 are equal.

That is, it is possible to compensate for a reduction in luminance caused by a reduction in the number of light sources L by supplying an increased amount of current to the light sources L arranged at the edges of the bottom cover 310, as compared to the light sources L arranged at the central portion of the bottom cover 310.

Fifteenth Embodiment

Figure 15:
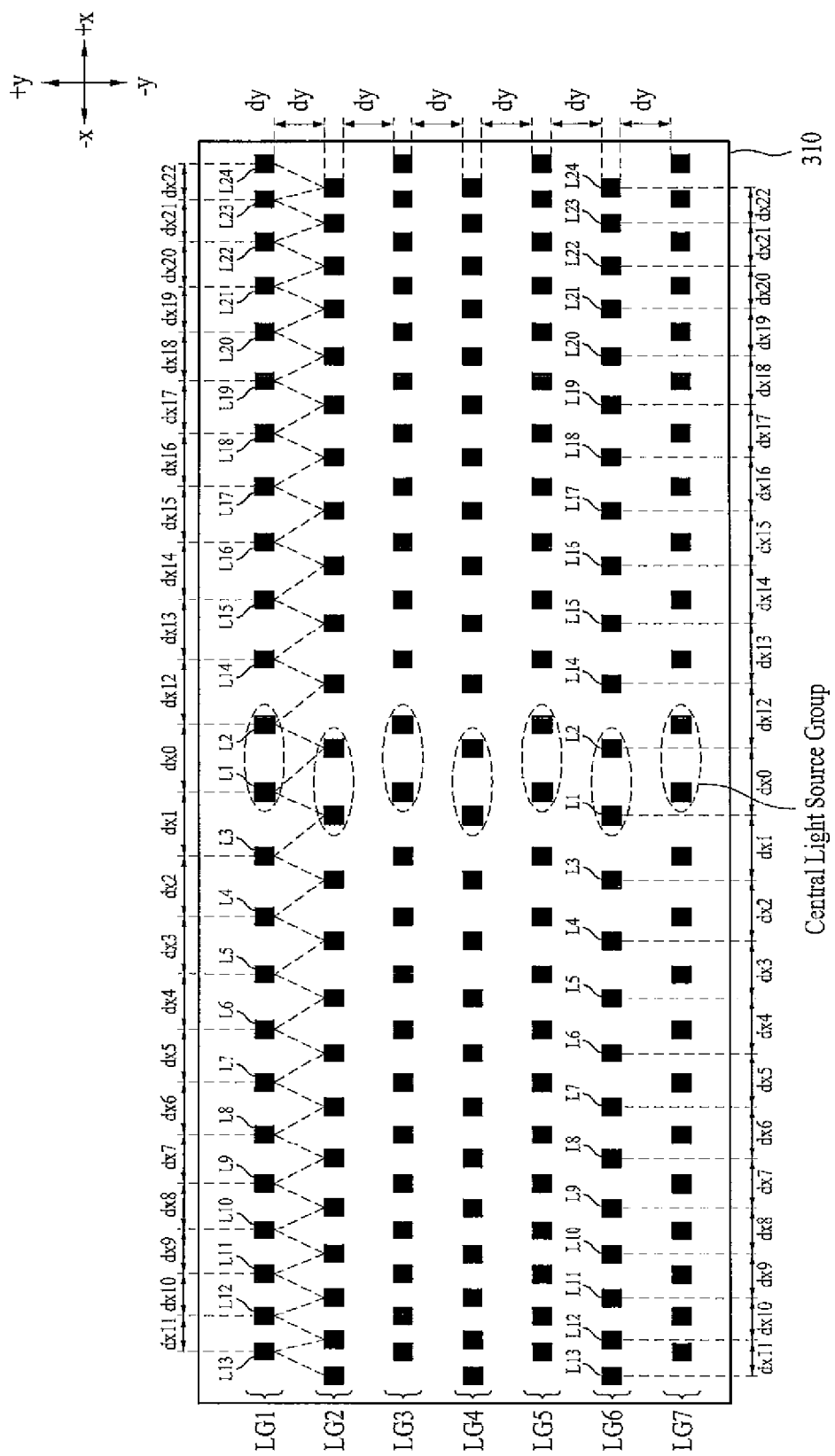
FIG. 15 is a view illustrating a backlight unit according to a fifteenth embodiment of the present invention.
Figure 16:
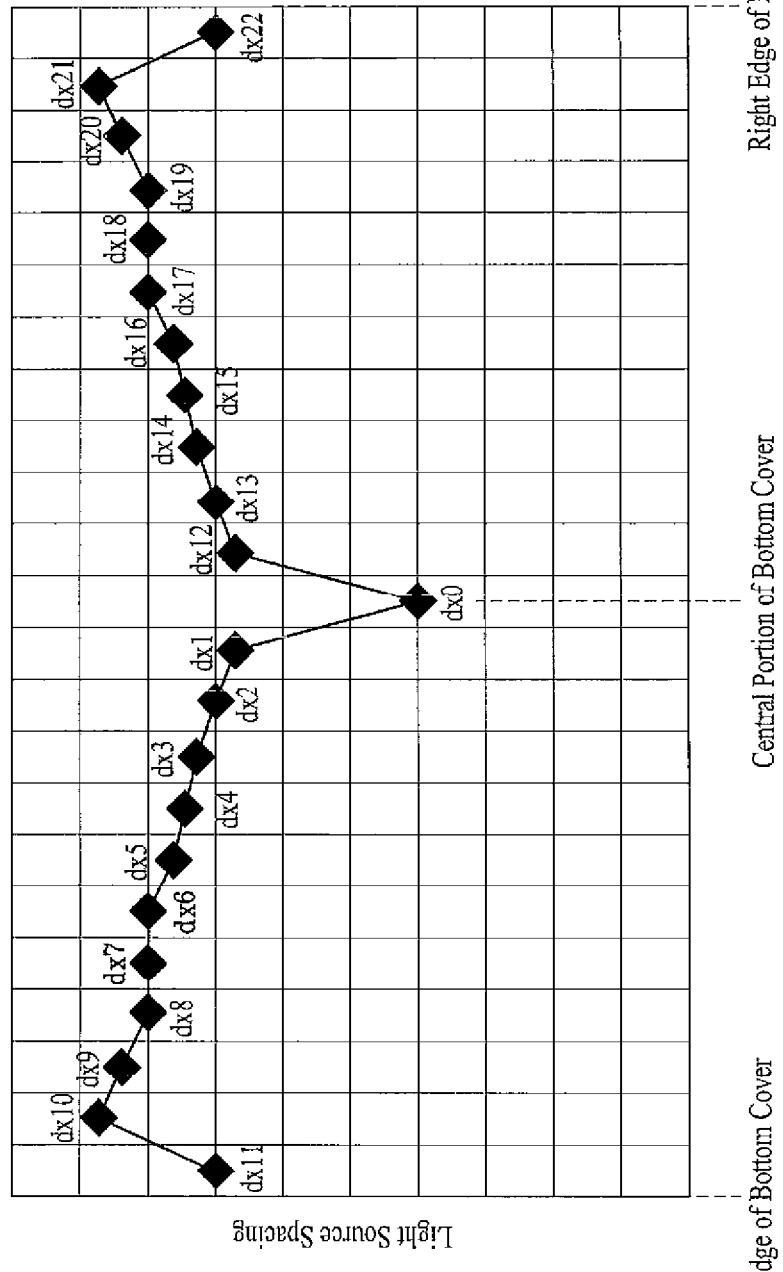
FIG. 16 is a graph depicting the spacing between the adjacent light sources in each light source group shown in FIG. 15.

FIG. 15 is a view illustrating a backlight unit according to a fifteenth embodiment of the present invention. FIG. 16 is a graph depicting the spacing between the adjacent light sources in each light source group shown in FIG. 15.

As shown in FIG. 15, the backlight unit according to the fifteenth embodiment of the present invention includes a bottom cover 310 formed with a plurality of light source groups LG1 to LG7 each including a plurality of light sources L1 to L24 arranged in one direction. The spacing between the adjacent light sources in each of the light source groups LG1 to LG7 increases gradually, and then decreases gradually from a central portion of the bottom cover 310 to opposite edges of the bottom cover 310.

The light sources L1 to L24 in each of the light source groups LG1 to LG7 are aligned in a longitudinal direction of longer sides of the bottom cover 310, namely, an X-axis direction. The light source groups LG1 to LG7 having the above-described arrangement are arranged in a longitudinal direction of shorter sides of the bottom cover 310, namely, a Y-axis direction.

The light sources L1 to L24 included in the adjacent light source groups are arranged in a zigzag manner. That is, the light sources L1 to L24 included in each odd light source group are shifted such that they are closer to the right edge of the bottom cover 310 than the light sources L1 to L24 included in each even light source group.

The light sources L included in each of the light source groups LG1 to LG7 have the same spacing dy between the adjacent light sources L. The light source groups LG1 to LG7 include the same number of light sources L1 to L24. The number of light sources is freely variable.

In particular, the spacing of the light sources L1 to L24 included in each of the light source groups LG1 to LG7 increases gradually, and then decreases gradually from the central portion of the bottom cover 310 to the opposite edges of the bottom cover 310. This will be described in more detail. Since the spacing of the light sources L1 to L24 increases and decreases in the same manner in all light source groups LG1 to LG7, the following description will be given only in conjunction with the first light source group LG1. Here, the spacing of the light sources L1 to L24 may mean the distance between the adjacent light sources or the distance between the central portions of the adjacent light sources. In the fifteenth embodiment, the spacing of the light sources L1 to L24 means the distance between the central portions of the adjacent light sources.

The first light source group LG1 may be divided into a central light source arranged at the central portion of the bottom cover 310, a plurality of first peripheral light sources arranged between the central light source and one of the opposite edges of the bottom cover 310, and a plurality of second peripheral light sources arranged between the central light source and the other edge of the bottom cover 310.

The central light source includes two light sources arranged nearest to the central portion of the bottom cover 310. That is, the central light source includes the first light source L1 arranged nearest to one side of the central portion of the bottom cover 310, and the second light source L2 arranged nearest to the other side of the central portion of the bottom cover 310.

The first peripheral light source groups include the light sources L3 to L13 arranged between the left side of the central light source and the left edge of the bottom cover 310. On the other hand, the second peripheral light sources include the light sources L14 to L24 arranged between the right side of the central light source and the right edge of the bottom cover 310.

The spacing of the light sources L1 to L24 increases gradually, and then decreases gradually from the central portion of the bottom cover 310 and the left edge of the bottom cover 130. Also, the spacing of the light sources L1 to L24 increases gradually, and then decreases gradually from the central portion of the bottom cover 310 and the right edge of the bottom cover 130.

For example, as shown in FIGS. 15 and 16, the spacing of the light sources L1 to L24 in each light source group increases gradually from the first light source L1 to the twelfth light source L12, and then decreases gradually from the twelfth light source L12 to the thirteenth light source L13. The spacing of the light sources L1 to L24 in each light source group also increases gradually from the second light source L2 to the twenty-third light source L23, and then decreases gradually from the twenty-third light source L23 to the twenty-fourth light source L24.

FIG. 17 is a table showing the results of comparison among backlight units including light sources arranged in different manners, respectively.

In FIG. 17, A, B, C, and D-type backlight units are shown.

Each of the A, B, C, and D-type backlight units includes light sources L1 to L24 and a bottom cover 310, which have the same structures as those of FIG. 15.

However, the A-type backlight unit is manufactured such that the light sources in each light source group have the same spacing, whereas the B, C, and D-type backlight units are manufactured such that the light sources in each light source group have different spacings. The C-type backlight unit corresponds to the backlight unit of the fifteenth embodiment shown in FIG. 15. The B and D-type backlight units have the same feature as the C-type backlight unit in that the light sources L1 to L24 included in each light source group increases gradually, and then decreases gradually from the central portion of the bottom cover 310 to the opposite edges of the bottom cover 310. The B, C, and D-type backlight units are different in that the light source spacing variations in the B, C, and D type backlight units are different.

The results of comparison among the backlight units obtained where the backlight units are applied to a 47-inch liquid crystal panel, based on images observed on the liquid crystal panel, are as follows.

The center point luminance represents the level of luminance at the central portion of the liquid crystal panel. It is desirable for this value to be higher. Among the A, B, C, and D-type backlight units, the B-type backlight unit exhibits a highest value in a center point luminance test. That is, in the center point luminance test, the B-type backlight unit exhibits most excellent results.

The luminance ratio exhibits a percentage of the center point luminance of each of the B, C, and D-type backlight unit to the center point luminance of the A-type backlight unit when it is assumed that the center point luminance of the A-type backlight unit is 100. It is desirable for this value to be higher. Among the A, B, C, and D-type backlight units, the B-type backlight unit exhibits a highest value in a luminance ratio test. That is, in the luminance ratio test, the B-type backlight unit exhibits most excellent results.

The luminance uniformity represents the ratio of the luminance in a display area exhibiting a highest luminance value to the luminance in a display area exhibiting a lowest luminance value where the liquid crystal panel is uniformly divided into a plurality of display areas (highest luminance value/lowest luminance value). It is desirable for this value to be lower. In this test, the liquid crystal panel was uniformly divided into 128 display areas. Among the A, B, C, and D-type backlight units, the A-type backlight unit exhibits a lowest value in a luminance uniformity test. That is, in the luminance uniformity test, the A-type backlight unit exhibits most excellent results.

The surface measurement result represents excellent luminance uniformity. The A and B-type backlight units exhibit good luminance uniformity. On the other hand, the C and D-type backlight units exhibit bad luminance uniformity. "PM-1234" means equipment for the surface measurement.

The luminance image exhibits visual luminance uniformity. Since the A and C-type backlight unit exhibit good luminance uniformity, light of uniform luminance is emitted at the entire surface of the display part in the liquid crystal panel, to which the A or C-type backlight unit is applied. In the liquid crystal panel, to which the B or D-type backlight unit is applied, however, high-luminance light is emitted at the central portion of the display part, as compared to other portions because the B and D-type backlight units exhibit bad luminance uniformity. As a result, bright lines are generated at the central portion of the display part.

Figure 18:
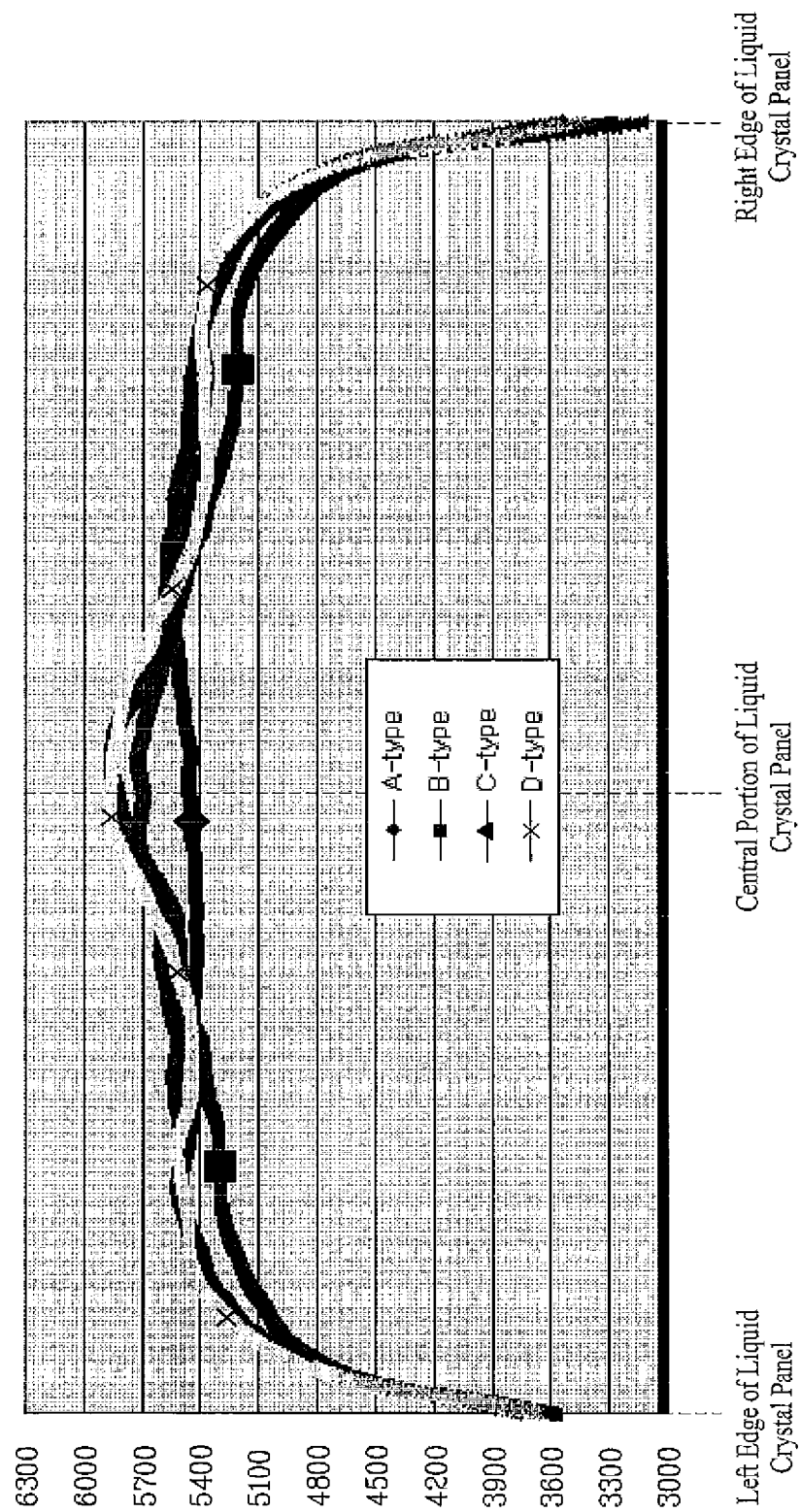
FIG. 18 is a graph depicting the luminance of light emitted from the liquid crystal panels, to which A, B, C, and D-type backlight units of FIG. 17 are applied, respectively.

FIG. 18 is a graph depicting the luminance of light emitted from the liquid crystal panels, to which the A, B, C, and D-type backlight units of FIG. 17 are applied, respectively.

The central portion of each liquid crystal panel corresponds to the central portion of the bottom cover 310. The left edge of each liquid crystal panel corresponds to the left edge of the bottom cover 310. The right edge of each liquid crystal panel corresponds to the right edge of the bottom cover 310.

In accordance with the above-described tests, the A-type backlight unit exhibits high luminance uniformity, but exhibits a low luminance ratio, as compared to the C-type backlight unit. The B and C-type backlight units have a problem in that bright lines are generated at the central portion of the display panel. Thus, in accordance with the collective results of the above-described tests, it can be seen that the C-type backlight unit is an optimal backlight unit.

Although not shown, the backlight units according to the first to fourteenth embodiment may have the same features as the fifteenth embodiment.

That is, the spacing of the adjacent light source groups in the cases of FIGS. 1 to 14 may increase gradually, and then decrease gradually from the central portion of the bottom cover 310 to the opposite edges of the bottom cover 310.

In each case, the light source groups include a central light source group arranged at the central portion of the bottom cover 310, a plurality of first peripheral light source groups arranged between the central light source group and one edge of the bottom cover 310, and a plurality of second peripheral light source groups arranged between the central light source group and the other edge of the bottom cover 310.

The spacing between the adjacent ones of the central light source group and the first peripheral light source groups increases gradually, and then decreases gradually from the central portion of the bottom cover 310 and one edge of the bottom cover 130. Also, the spacing between the adjacent ones of the central light source group and the second peripheral light source groups increases gradually, and then decreases gradually from the central portion of the bottom cover 310 and the other edge of the bottom cover 130.

The central light source group includes a first central light source group arranged nearest to one side of the central portion of the bottom cover 310, and a second central light source group arranged nearest to the other side of the central portion of the bottom cover 310.

The light sources included in each light source group are aligned in a longitudinal direction of shorter sides of the bottom cover 310. The light source groups include the same number of light sources. The spacing between the corresponding light sources respectively included in the adjacent ones of the light source groups increases gradually, and then decreases gradually from the central portion of the bottom cover 310 to the opposite edges of the bottom cover 310. The light sources included in each light source group have the same spacing between the adjacent light sources. Alternatively, the spacing of the light sources included in each light source group may increase gradually, and then decrease gradually, as in the fifteenth embodiment.

In another arrangement, the light sources included in each light source group are aligned in a longitudinal direction of longer sides of the bottom cover 310. In this case, the spacing between the corresponding light sources respectively included in the adjacent ones of the light source groups increases gradually, and then decreases gradually from the central portion of the bottom cover 310 to the opposite edges of the bottom cover 310.

In another arrangement, the light sources included in each light source group are aligned in a longitudinal direction of the shorter sides of the bottom cover 310. In this case, the light source groups include the same number of light sources. The spacing between the corresponding light sources respectively included in the adjacent ones of the light source groups increases gradually, and then decreases gradually from the central portion of the bottom cover 310 to the edges of the bottom cover 310. Alternatively, the spacing between the adjacent light sources in each light source group may increase gradually, and then decrease gradually from the central portion of the light source group to the opposite edges of the bottom cover 310.

Meanwhile, the spacing between the adjacent light source groups in the first to fourteenth embodiments may correspond to the distance between the central portions of the corresponding light sources respectively included in the adjacent light source groups.

The backlight unit, which has any one of the above described arrangements, may be mounted to a liquid crystal display (LCD) device.

Figure 19:
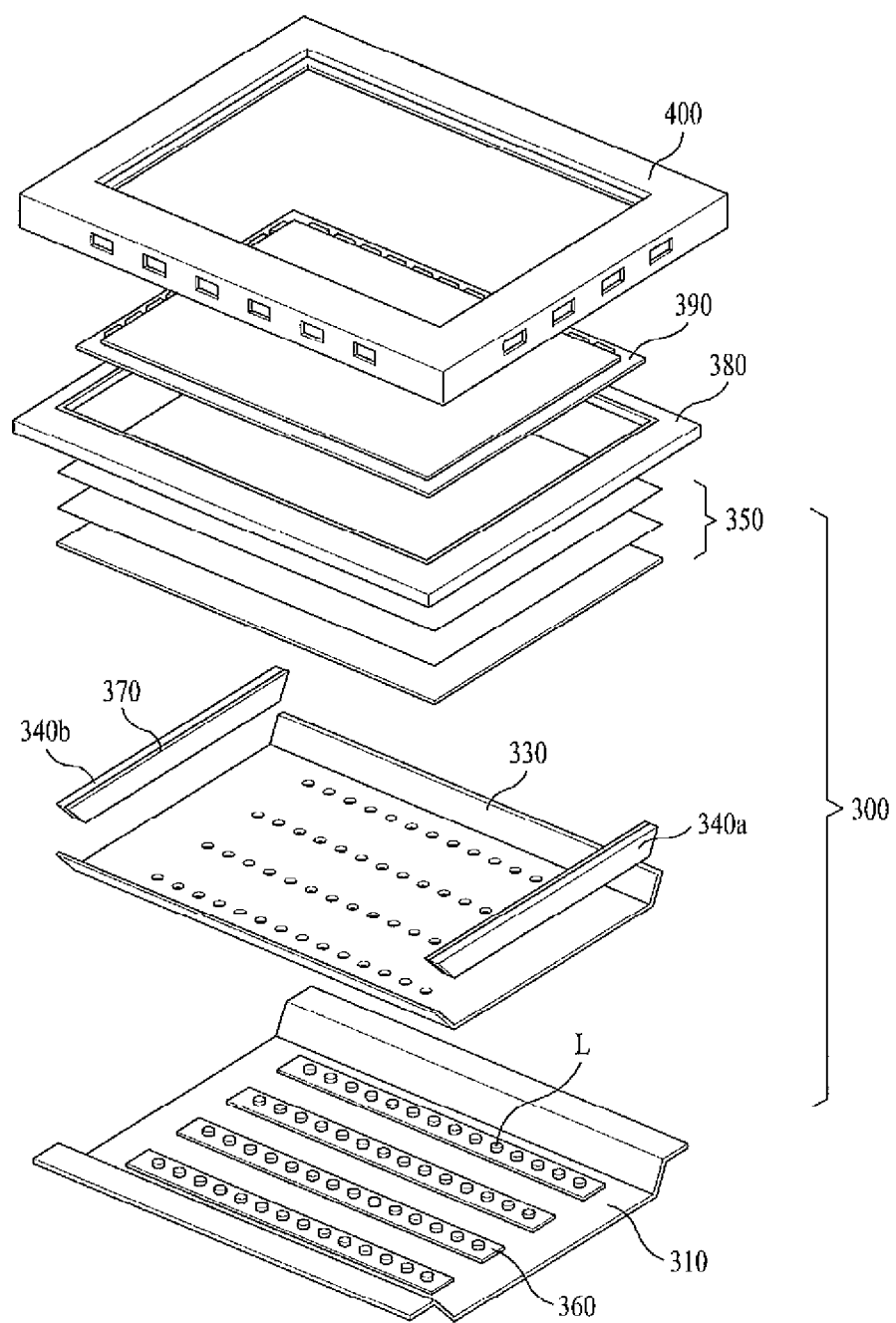
FIG. 19 is a view illustrating an LCD device, to which a backlight unit is mounted, in accordance with a sixteenth embodiment of the present invention.

FIG. 19 is a view illustrating an LCD device, to which a backlight unit is mounted, in accordance with an exemplary embodiment of the present invention.

Referring to FIG. 19, the LCD device according to the exemplary embodiment of the present invention includes a backlight unit 300, a liquid crystal panel 390, a support main 380, and a top cover 400.

The backlight unit 300 may be configured by any one of the backlight units according to the present invention as shown in FIGS. 1 to 14.

The backlight unit 300 includes a bottom cover 310 opened at opposite lateral ends thereof, a plurality of light sources L installed on a bottom surface of the bottom cover 310, and side supports 340a and 340b respectively coupled to the opened opposite lateral ends of the bottom cover 110, to reflect light emitted from the light sources L.

The light sources L are mounted on printed circuit boards (PCBs) 360. Each light source L receives drive current from an inverter via the corresponding PCB 360, thereby emitting light.

A flat reflecting member 330 is arranged on the bottom cover 310. The flat reflecting member 330 is formed with a plurality of holes, through which respective light sources L are extendable. The flat reflecting member 330 covers the PCBs 360 while allowing only the light sources L, which emit light, to be protruded from the flat reflecting member 330 through the holes. The flat reflecting member 330 functions to widely diffuse point light beams emitted from the light sources L.

An optical member 350, which is constituted by a diffusion plate, and a plurality of optical sheets, are arranged over the bottom cover 310. The diffusion plate diffuses light emitted from the light sources L over the overall area of the liquid crystal panel 100.

The liquid crystal panel 390 includes a transistor array substrate and a color filter array substrate, which are assembled in a facing state. The liquid crystal panel 390 also includes spacers (not shown) for maintaining a desired cell gap between the two array substrates, and a liquid crystal layer (not shown) filled in liquid crystal spaces defined by the spacers.

The color filter array substrate includes color filters, common electrodes, and black matrixes. Alternatively, the common electrodes may be formed on the transistor array substrate.

The transistor array substrate includes thin film transistors (TFTs) respectively formed in regions defined by a plurality of data lines (not shown) and a plurality of gate lines (not shown). Each TFT is connected to a corresponding one of the data lines and a corresponding one of the gate lines. The transistor array substrate also includes liquid crystal cells (not shown) connected to respective TFTs.

The support main 380 is coupled to the bottom cover 310. The top cover 400, which has a rectangular frame structure, to support the edges of the liquid crystal panel 390, is fastened to the support main 380 and bottom cover 310. The bottom cover 310 is coupled with the support main 380, so that it functions as a bottom case, in which the backlight unit 300 is received.

The top cover 400 encloses the front surface edges of the liquid crystal panel 390 arranged on the bottom cover 310, and the lateral ends of the bottom cover 310. For this function, the top cover 400 includes a flat portion for covering a non-display area of the liquid crystal panel 390, except for a display area of the liquid crystal panel 390, namely, the edges of the liquid crystal panel 390, and a rim portion vertically bent from the flat portion, to enclose the lateral ends of the bottom cover 310.

Meanwhile, the positions of the light sources in each of the above-described first to fifteenth embodiments may be adjusted in the following manner, in order to achieve an enhancement in the center point luminance of the associated backlight unit.

Figure 20:
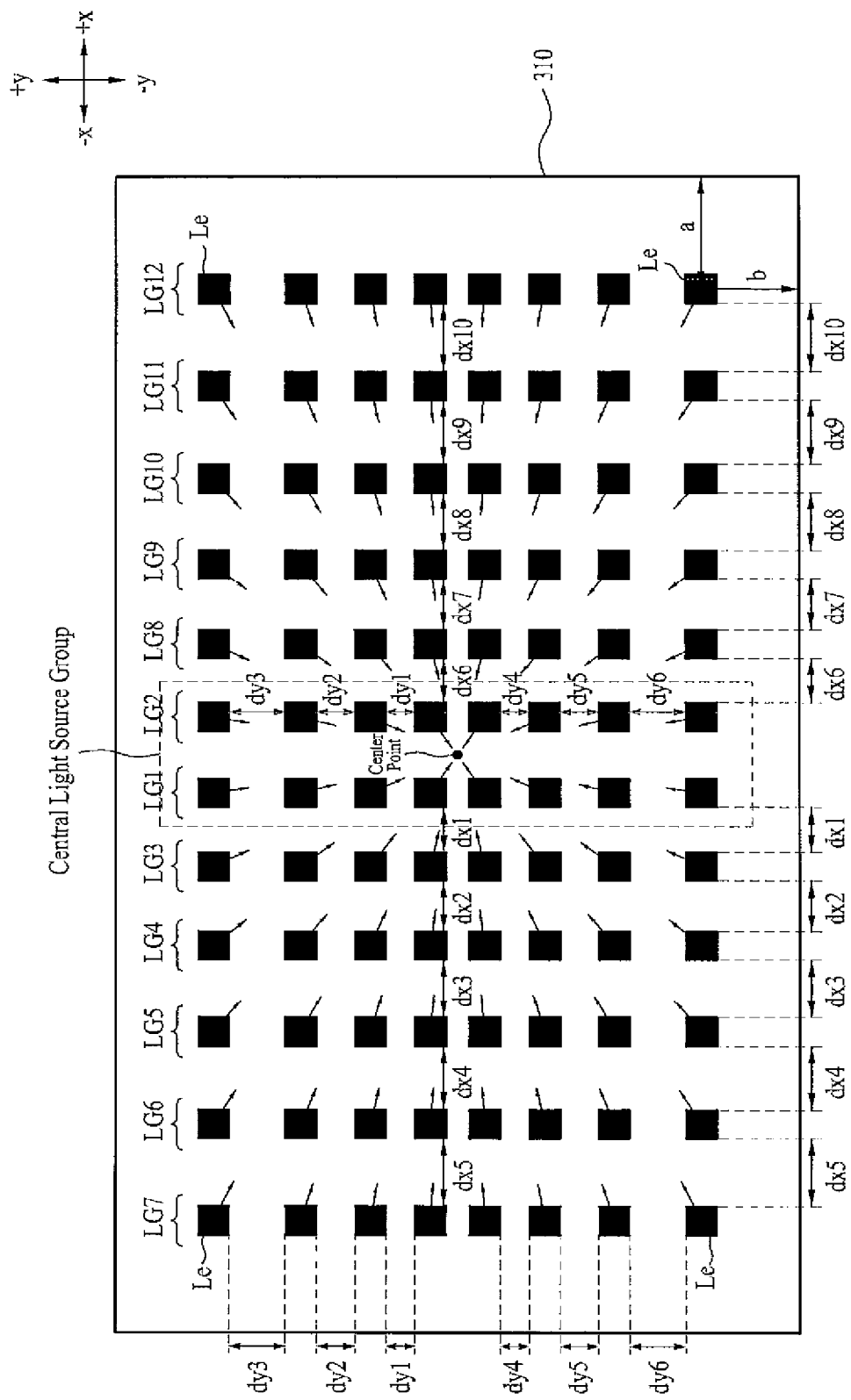
FIGS. 20 to 22 are views for explaining a method for adjusting the positions of light sources.
Figure 21:
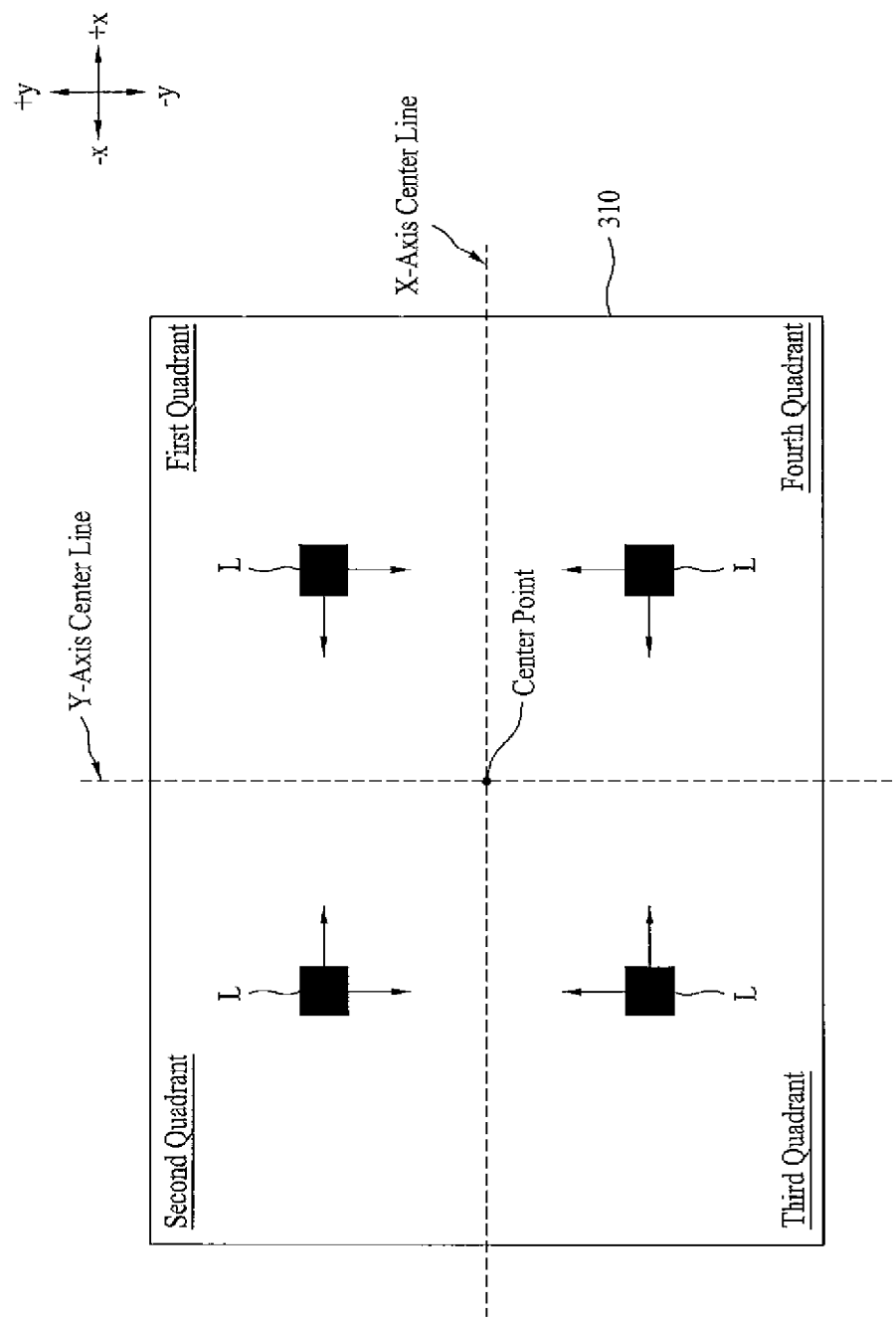
Figure 22:
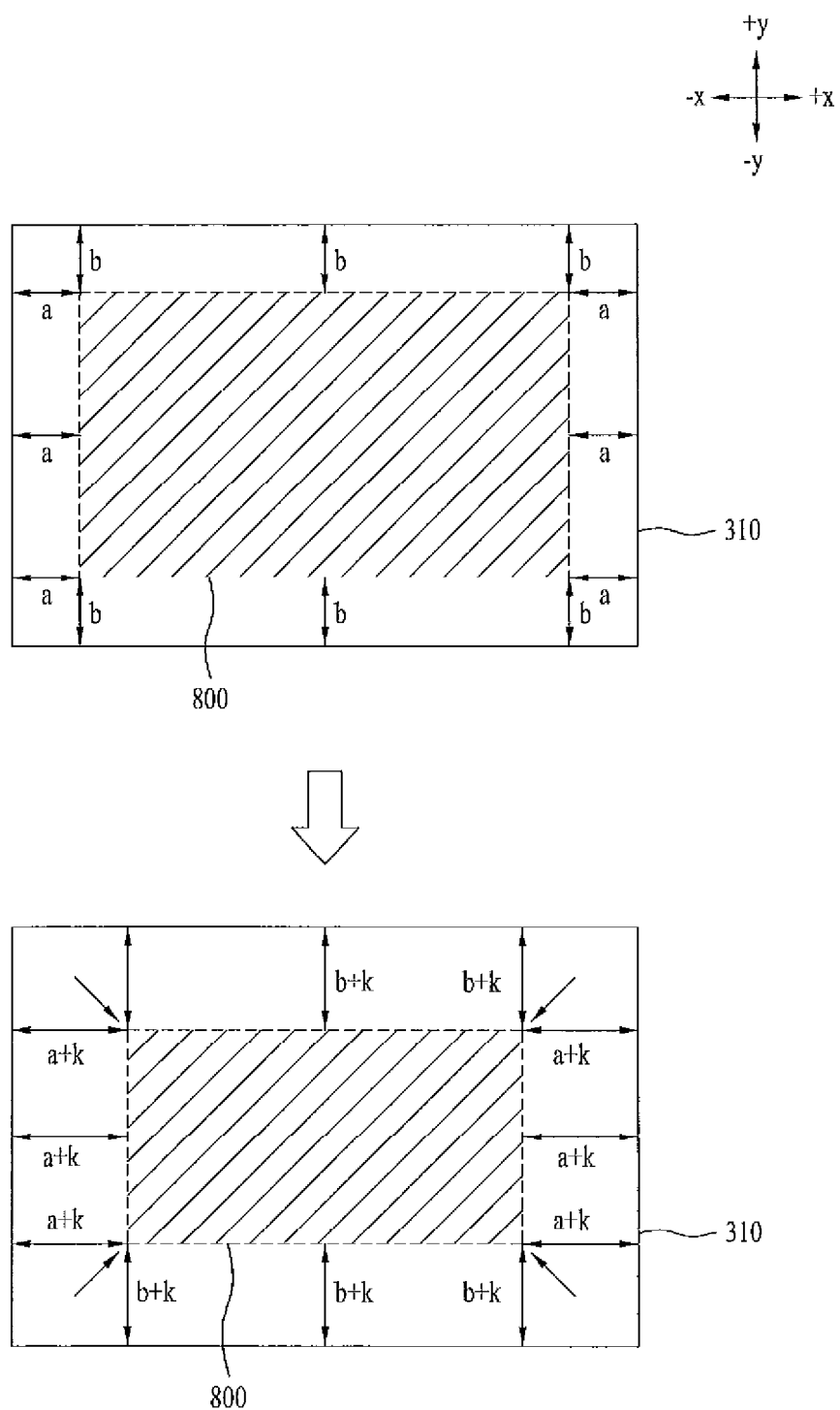

FIGS. 20 to 22 are views for explaining a method for adjusting the positions of light sources.

The backlight unit shown in FIG. 20 has the same arrangement as that of FIG. 3 illustrating the third embodiment.

From among the light sources shown in FIG. 20, the outermost light sources arranged adjacent to each edge of the bottom cover 310 are spaced apart from the edge of the bottom cover 310 by a distance of "a" or "b". In detail, the central portion of the outermost light source Le arranged adjacent to each corner of the bottom cover 310 is spaced apart from the edges of the bottom cover 310 defining the corner of the bottom cover 310 by "a" in an X-axis direction and by "b" in a Y-axis direction, respectively. On the other hand, the outermost light sources arranged between the outermost light sources Le arranged at the corners of the bottom cover 310 defined by the same edge of the bottom cover 310 are spaced apart from the edge of the bottom cover 310 by "a" or "b".

It is possible to achieve an increase in center point luminance by increasing the values of "a" and "b". Hereinafter, the value "a" will be defined as an X-axis outer spacing, and the value "b" will be defined as a Y-axis outer spacing.

Increasing the X or Y-axis outer spacing means moving the outermost light sources toward the center point of the bottom cover 310. In this case, the remaining light sources arranged inside the outermost light sources are also moved toward the center point of the bottom cover 310 by the same distance as that of the outermost light sources moving toward the center point of the bottom cover 310. Thus, all light sources L arranged on the bottom cover 310 are moved toward the center point of the bottom cover 310.

That is, as shown in FIG. 21, the light sources L arranged on a first quadrant of the bottom cover 310 are moved in a downward direction toward an X-axis center line, while being moved in a left direction toward a Y-axis center line. The light sources L arranged on a second quadrant of the bottom cover 310 are moved in a downward direction toward the X-axis center line, while being moved in a right direction toward the Y-axis center line. The light sources L arranged on a third quadrant of the bottom cover 310 are moved in an upward direction toward the X-axis center line, while being moved in a right direction toward the Y-axis center line. The light sources L arranged on a fourth quadrant of the bottom cover 310 are moved in an upward direction toward the X-axis center line, while being moved in a left direction toward the Y-axis center line. Thus, all light sources L arranged on the bottom cover 310 are moved toward the center point of the bottom cover 310.

For example, when the X-axis outer spacing is increased from "a" by "k", and the Y-axis outer spacing is increased from "b" by "k", as shown in FIG. 22, the area of the light source region 800 is reduced. Since the number of light sources L arranged on the light source region 800 is constant between before and after the area reduction of the light source region 800, the density of light sources L after the area reduction of the light source region 800 is higher than the density of light sources L before the area reduction of the light source region 800. This means an increase in center point luminance after the area reduction of the light source region 800.

Although the increased X or Y-axis outer spacing provides an advantage of an increase in center point luminance, a degradation in luminance uniformity occurs because the luminance at the outer portion of the bottom cover 310 is lower than the luminance at the central portion of the bottom cover 310. That is, the center point luminance and the luminance uniformity are inversely proportional to each other.

Accordingly, it is necessary to adjust the X and Y-axis outer spacings, taking into consideration the luminance uniformity. In other words, it is desirable to increase the X and Y-axis outer spacings within an appropriate luminance uniformity range.

As described above, the luminance uniformity represents the ratio of the luminance in a display area exhibiting a highest luminance value to the luminance in a display area exhibiting a lowest luminance value where the liquid crystal panel is uniformly divided into a plurality of display areas (highest luminance value/lowest luminance value). In the above-described test, the liquid crystal panel was uniformly divided into 128 display areas.

In the luminance uniformity test for setting the X and Y-axis outer spacings, however, luminance uniformity is measured under the condition in which the liquid crystal panel is uniformly divided into 17 display areas.

Hereinafter, the luminance uniformity measuring method will be described in detail.

First, one of the backlight units according to the first to fifteenth embodiments is prepared. Thereafter, the X and Y-axis outer spacings in the backlight unit are increased.

The luminance uniformity of the backlight unit is then measured. When the measured value is within a predetermined numerical range, the backlight unit, which has the increased X and Y-axis outer spacings, is normally usable.

However, when the measured value does not satisfy the predetermined numerical range, it is necessary to re-adjust the X and Y-axis outer spacings.

The X and Y-axis outer spacings are also influenced by the optical distance of the backlight unit. The optical distance of the backlight unit means the distance from the bottom surface of the bottom cover (the inner surface of the bottom cover, on which the PCBs 360 of FIG. 19 are mounted) to a diffusion sheet (the sheet arranged nearest to the bottom cover from among the sheets constituting the optical member 350 of FIG. 9). When the optical distance increases, it is possible to increase the X and Y-axis outer spacings. That is, the optical distance has influence on the increase margins of the X and Y-axis outer spacings.

The above-described outer spacing adjusting method is also applicable to conventional backlight units in which light sources have the same spacing between adjacent light sources (X and Y-axis spacings).

Meanwhile, the X and Y-axis outer spacing may correspond to ½ of the spacing between the adjacent two light sources. For example, in the arrangement according to the first embodiment shown in FIG. 1, the Y-axis outer spacing corresponds to ½ of the fixed Y-axis spacing dy. On the other hand, the X-axis outer spacing corresponding to ½ of the fifth spacing dx5 or tenth spacing dx10, which is largest. Similarly, the arrangement according to the second embodiment shown in FIG. 2, the X-axis outer spacing corresponds to ½ of the fixed X-axis spacing dx. On the other hand, the Y-axis outer spacing corresponding to ½ of the third spacing dy3 or sixth spacing dx6, which is largest.

The backlight units described with reference to FIGS. 20 to 22 are applicable to the LCD device shown in FIG. 19.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
a bottom cover formed with a plurality of light source groups each including a plurality of light sources arranged in one direction,
wherein the light source groups have a spacing between adjacent ones of the light source groups, the spacing increases gradually from a central portion of the bottom cover to opposite edges of the bottom cover,
wherein current supplied to the plurality of light sources increases gradually from the central portion of the bottom cover to the opposite edges of the bottom cover, and
wherein the light sources included in each odd light source group are shifted such that they are closer to a lower edge of the bottom cover than the light sources included in each even light source group such that the light sources included in the adjacent light source groups are arranged in a zigzag manner.

2. The backlight unit according to claim 1, wherein:
the light source groups comprise a central light source group arranged at the central portion of the bottom cover, a plurality of first peripheral light source groups arranged between the central light source group and one edge of the bottom cover, and a plurality of second peripheral light source groups arranged between the central light source group and the other edge of the bottom cover;
the central light source group and the first peripheral light source groups have a spacing between adjacent ones of the central light source group and the first peripheral light source groups, the spacing increasing gradually from the central portion of the bottom cover and one edge of the bottom cover; and
the central light source group and the second peripheral light source groups have a spacing between adjacent ones of the central light source group and the second peripheral light source groups, the spacing increasing gradually from the central portion of the bottom cover and the other edge of the bottom cover.

3. The backlight unit according to claim 2, wherein the central light source group comprises:
a first central light source group arranged nearest to one side of the central portion of the bottom cover; and
a second central light source group arranged nearest to the other side of the central portion of the bottom cover.

4. The backlight unit according to claim 2, wherein:
the light sources included in each of the light source groups are aligned in a longitudinal direction of shorter sides of the bottom cover;
the light source groups have the same number of light sources;
the light sources respectively included in the adjacent ones of the light source groups while corresponding to each other have a spacing increasing gradually from the central portion of the bottom cover to the opposite edges of the bottom cover; and
the light sources included in each of the light source groups have the same spacing.

5. The backlight unit according to claim 2, wherein:
the light sources included in each of the light source groups are aligned in a longitudinal direction of longer sides of the bottom cover;
the light source groups have the same number of light sources; and
the light sources respectively included in the adjacent ones of the light source groups while corresponding to each other have a spacing increasing gradually from the central portion of the bottom cover to the opposite edges of the bottom cover.

6. The backlight unit according to claim 2, wherein:
the light sources included in each of the light source groups are aligned in a longitudinal direction of shorter sides of the bottom cover;
the light source groups have the same number of light sources;
the light sources respectively included in the adjacent ones of the light source groups while corresponding to each other have a spacing increasing gradually from the central portion of the bottom cover to the opposite edges of the bottom cover; and
the light sources included in each of the light source groups have a spacing between adjacent ones of the light sources, the spacing increasing gradually from the central portion of the bottom cover to the opposite edges of the bottom cover.

7. The backlight unit according to claim 6, wherein the spacing of the corresponding light sources respectively included in the adjacent light source groups and the spacing of the adjacent light sources in each of the light source groups have the same spacing increase rate.

8. The backlight unit according to claim 7, wherein the spacing increase rate is 0.2 mm.

9. The backlight unit according to claim 6, wherein the spacing of the corresponding light sources respectively included in the adjacent light source groups and the spacing of the adjacent light sources in each of the light source groups have different spacing increase rates, respectively.

10. A backlight unit comprising:
a bottom cover formed with a plurality of light source groups each including a plurality of light sources arranged in one direction,
wherein the light source groups have a spacing between adjacent ones of the light source groups, the spacing increases gradually, and then decreases gradually from a central portion of the bottom cover to opposite edges of the bottom cover, and
wherein the plurality of light sources included in each odd light source group is shifted to be closer to a right edge of the bottom cover than the plurality of light sources included in each even light source group such that the plurality of light sources included in an adjacent light source group is arranged in a zigzag manner.

11. The backlight unit according to claim 10, wherein:

the light source groups comprise a central light source group arranged at the central portion of the bottom cover, a plurality of first peripheral light source groups arranged between the central light source group and one edge of the bottom cover, and a plurality of second peripheral light source groups arranged between the central light source group and the other edge of the bottom cover;

the central light source group and the first peripheral light source groups have a spacing between adjacent ones of the central light source group and the first peripheral light source groups, the spacing increasing gradually, and then decreasing gradually from the central portion of the bottom cover and one edge of the bottom cover; and the central light source group and the second peripheral light source groups have a spacing between adjacent ones of the central light source group and the second peripheral light source groups, the spacing increasing gradually, and then decreasing gradually from the central portion of the bottom cover and the other edge of the bottom cover.

12. The backlight unit according to claim 11, wherein the central light source group comprises:

a first central light source group arranged nearest to one side of the central portion of the bottom cover; and a second central light source group arranged nearest to the other side of the central portion of the bottom cover.

13. The backlight unit according to claim 11, wherein:

the light sources included in each of the light source groups are aligned in a longitudinal direction of shorter sides of the bottom cover;

the light source groups have the same number of light sources;

the light sources respectively included in the adjacent ones of the light source groups while corresponding to each other have a spacing increasing gradually, and then decreasing gradually from the central portion of the bottom cover to the opposite edges of the bottom cover; and the light sources included in each of the light source groups have the same spacing.

14. The backlight unit according to claim 11, wherein:

the light sources included in each of the light source groups are aligned in a longitudinal direction of longer sides of the bottom cover;

the light source groups have the same number of light sources; and the light sources respectively included in the adjacent ones of the light source groups while corresponding to each other have a spacing increasing gradually, and then decreasing gradually from the central portion of the bottom cover to the opposite edges of the bottom cover.

15. The backlight unit according to claim 11, wherein:

the light sources included in each of the light source groups are aligned in a longitudinal direction of shorter sides of the bottom cover;

the light source groups have the same number of light sources;

the light sources respectively included in the adjacent ones of the light source groups while corresponding to each other have a spacing increasing gradually, and then decreasing gradually from the central portion of the bottom cover to the opposite edges of the bottom cover; and the light sources included in each of the light source groups have a spacing between adjacent ones of the light sources, the spacing increasing gradually, and then decreasing gradually from the central portion of the bottom cover to the opposite edges of the bottom cover.

16. The backlight unit according to claim 10, wherein the spacing between the adjacent light source groups corresponds to a distance between central portions of the light sources respectively included in the adjacent light source groups.

* * * * *

UNITED STATES PATENT AND TRADEMARK OFFICE
CERTIFICATE OF CORRECTION

| | | |
|---|---|---|
| PATENT NO. | : 8,550,646 B2 | Page 1 of 1 |
| APPLICATION NO. | : 12/266785 | |
| DATED | : October 8, 2013 | |
| INVENTOR(S) | : Kwon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this
Tenth Day of March, 2015

Michelle K. Lee
*Deputy Director of the United States Patent and Trademark Office*